United States Patent
Soejima

(10) Patent No.: US 8,895,829 B2
(45) Date of Patent: Nov. 25, 2014

(54) MUSIC PLAYING MOVEMENT DISPLAY DEVICE, METHOD AND RECORDING MEDIUM

(71) Applicant: Casio Computer Co., Ltd., Tokyo (JP)

(72) Inventor: Junichiro Soejima, Tokyo (JP)

(73) Assignee: Casio Computer Co., Ltd., Tokyo (JP)

(*) Notice: Subject to any disclaimer, the term of this patent is extended or adjusted under 35 U.S.C. 154(b) by 73 days.

(21) Appl. No.: 13/661,607

(22) Filed: Oct. 26, 2012

(65) Prior Publication Data
US 2013/0104724 A1    May 2, 2013

(30) Foreign Application Priority Data
Oct. 31, 2011   (JP) ................. 2011-238333

(51) Int. Cl.
*G09B 15/00* (2006.01)
*G09B 15/02* (2006.01)
*G09B 15/04* (2006.01)
*G09B 15/06* (2006.01)
*G09B 15/08* (2006.01)
*G09B 5/06* (2006.01)
*G10H 1/00* (2006.01)
*G10G 1/02* (2006.01)

(52) U.S. Cl.
CPC ............. *G10H 1/00* (2013.01); *G09B 15/003* (2013.01); *G09B 15/00* (2013.01); *G10H 1/0016* (2013.01); *G09B 15/08* (2013.01); *G09B 5/06* (2013.01); *G09B 15/023* (2013.01); *G10G 1/02* (2013.01); *G09B 15/06* (2013.01)
USPC ......... 84/485 R; 84/467; 84/470 R; 84/477 R

(58) Field of Classification Search
CPC ...... G09B 15/00; G09B 15/08; G09B 15/023; G09B 15/003; G09B 15/06; G09B 5/06; G10H 1/0016; G10G 1/02
USPC .......... 84/485 R, 467, 470 R, 477 R
See application file for complete search history.

(56) References Cited

U.S. PATENT DOCUMENTS 5,585,583 A * 12/1996 Owen .................. 84/470 R
5,690,496 A * 11/1997 Kennedy ............... 434/307 R
(Continued)

FOREIGN PATENT DOCUMENTS

JP          58192671 U     12/1983
JP        2002-099276 A     4/2002
(Continued)

OTHER PUBLICATIONS

Japanese Office Action dated Oct. 22, 2013 (and English translation thereof) in counterpart Japanese Application No. 2011-238333.

(Continued)

*Primary Examiner* — David Warren
*Assistant Examiner* — Christina Russell
(74) *Attorney, Agent, or Firm* — Holtz, Holtz, Goodman & Chick PC

(57) ABSTRACT

A music playing movement display device includes CPU displaying a music playing movement image on a display unit based on music playing information, movement information, and structural data stored in RAM. the CPU determines whether to perform display of a music playing technique based on a music playing technique flag of the music playing information stored in the RAM, and, when determining to perform the display of the music playing technique, allows to change a display mode of the image corresponding to the music playing technique, compared to a display mode of a image corresponding to that of a case of not displaying the music playing technique.

7 Claims, 25 Drawing Sheets

(56) References Cited

U.S. PATENT DOCUMENTS

| | | | |
|---|---|---|---|
| 6,486,388 B2* | 11/2002 | Akahori | 84/478 |
| 6,582,235 B1* | 6/2003 | Tsai et al. | 434/307 A |
| 7,288,712 B2* | 10/2007 | Uehara | 84/645 |
| 7,361,829 B2* | 4/2008 | Uehara | 84/746 |
| 7,674,965 B2* | 3/2010 | Mataele | 84/483.2 |
| 7,767,898 B2* | 8/2010 | Nakayama et al. | 84/612 |
| 8,338,684 B2* | 12/2012 | Pillhofer et al. | 84/470 R |
| 8,766,077 B2* | 7/2014 | Soejima | 84/477 R |
| 2004/0244570 A1* | 12/2004 | Ando | 84/744 |
| 2005/0172780 A1* | 8/2005 | Masuda | 84/100 |
| 2006/0137511 A1* | 6/2006 | McGregor | 84/478 |
| 2013/0068086 A1* | 3/2013 | Mittelstadt et al. | 84/645 |
| 2013/0199357 A1* | 8/2013 | Soejima | 84/467 |

FOREIGN PATENT DOCUMENTS

| | | | |
|---|---|---|---|
| JP | 3528051 B2 | 4/2002 | |
| JP | 2003-058157 A | 2/2003 | |
| JP | 2003058157 A * | 2/2003 | G10H 1/00 |

OTHER PUBLICATIONS

Japanese Office Action dated May 20, 2014 in counterpart Japanese Application No. 2011-238333.

* cited by examiner

| handCtrl | width |
| --- | --- |
| | height |
| | f0vy |
| | Center[3] |
| | Eye[3] |
| | Eyevector[3] |
| | NoteR[ ] |
| | StructR[ ] |
| | MotionR[ ] |
| | IndexR |
| | NoteL[ ] |
| | StructL[ ] |
| | MotionL[ ] |
| | IndexL |

FIG.8

| Motion[0] | Time |
| | RootPos[3] |
| Motion[1] | |
| | |
| | |
| | ... |
| | |
| Motion[N] | |
| | |
| | |
| | ... |
| | |

FIG.18

| | |
|---|---|
| Motion[0] | Time |
| | RootPos[3] |
| | MaxHandPos[3] |
| | MinHandPos[3] |
| | WristPos[3] |
| Motion[1] | |
| | |
| | |
| | ... |
| Motion[N] | |
| | |
| | |
| | ... |

FIG.21

| handCtrl | width |
| --- | --- |
| | height |
| | f0vy |
| | Center[3] |
| | Eye[3] |
| | Eyevector[3] |
| | Vertical[3] |
| | Horizontal[3] |
| | AutoAngleStatus |
| | Start |
| | Return |
| | EyeVectorN[3] |
| | EyeAngle |
| | NoteR[ ] |
| | StructR[ ] |
| | MotionR[ ] |
| | IndexR |
| | NoteL[ ] |
| | StructL[ ] |
| | MotionL[ ] |
| | IndexL |

FIG.22

| Note[0] | Time |
| | Gate |
| | Pitch |
| | Finger |
| | FigTech[ ] |
| Note[1] | |
| | ... |
| Note[N] | |
| | ... |

MUSIC PLAYING MOVEMENT DISPLAY DEVICE, METHOD AND RECORDING MEDIUM

This application is based upon and claims the benefit of priority from the prior Japanese Patent Application No. 2011-238333, filed Oct. 31, 2011, and the entire contents of which are incorporated herein by reference.

BACKGROUND OF THE INVENTION

1. Field of the Invention

The present invention relates to a music playing movement display device, a music playing movement display method, and a storage medium.

2. Related Art

Thus far, a music playing movement display device has been proposed which has a navigation function that notifies to a user of a finger to use for a keying operation on a key to be pressed (operated) according to the progression of a musical performance. For example, Japanese Patent No. 3528051 proposes a music playing movement display device having a navigation function that notifies the user of a finger to use for a key operation by way of displaying, on a display unit, a position of a finger on the keyboard as a music playing movement while playing music. Furthermore, with the music playing movement display device proposed in Japanese Patent No. 3528051, the matters of enlarging or reducing the display size of a finger, displaying a finger transparently, displaying a finger in a wire frame representation, changing a point of view (display angle), and the like in response to receiving a change operation for the display format of music playing movements fore ach part of the musical performance have been also proposed therein.

However, with the music playing movement display device proposed in Japanese Patent No. 3528051, there may be a case where an entire keyboard is displayed for a part in which both hands are placed to be away from each other. Since a keyboard is long in a lateral direction, in a case of the entire keyboard being displayed, a finger used for a keying operation is displayed to be small on a display unit.

Furthermore, with the music playing movement display device proposed in Japanese Patent No. 3528051, although it is possible to accept an operation for changing a display format such as enlarging or reducing as described above, it is difficult for a player to perform the operation for changing while playing music. Moreover, regarding the music playing movement display device proposed in Japanese Patent No. 3528051, it is not possible to change a point of view automatically. For this reason, in a case in which a player tries to review a specific playing technique such as a delicate finger movement, it is necessary for the player himself/herself to perform an operation to change the point of view. Therefore, with the music playing movement display device proposed in Japanese Patent No. 3528051, it may be difficult for a user to review a specific playing technique while playing music.

SUMMARY OF THE INVENTION

The present invention addresses such problems and has object of providing a music playing movement display device that allows the display of a music playing movement which can be easily recognized visually for a player, a music playing movement display method, and a recording medium.

In order to achieve the abovementioned object, a music playing movement display device according to one aspect of the present invention includes: a memory that stores (a) music playing information including a sound production starting time, a sound continuation time, a pitch, and a finger used, (b) a structural data group including a plurality of kinds of structural data and structure-relation data that determines the relevance between the structural data, and (c) movement information that shows information of the structural data corresponding to the sound production starting time and serving as an origin when displaying a plurality of the structural data; a determination unit that determines whether to display a specific movement; and a display controller that displays a music playing movement image on a display unit based on the music playing information, the movement information, and the structural data group stored in the memory, and when the determination unit determines to display the specific movement, displays a music playing movement image corresponding to the specific movement in a first display mode on the display unit, and displays a music playing movement image corresponding to a case of not displaying the specific movement in a second display mode, which is different from the first display mode, on the display unit.

Furthermore, a music playing movement display method, according to one aspect of the present invention, executed by a music playing movement display device including a memory that stores (a) music playing information including a sound production starting time, a sound continuation time, a pitch, and a finger used, (b) a structural data group including a plurality of kinds of structural data and structure-relation data that determines the relevance between the structural data, and (c) movement information that shows information of the structural data corresponding to the sound production starting time and serving as an origin when displaying a plurality of the structural data, includes the steps of: determining whether to display a specific movement; and controlling to display a music playing movement image on a display unit based on the music playing information, the movement information, and the structural data group stored in the memory, and when it has been determined in the step of determining to display the specific movement, displaying a music playing movement image corresponding to the specific movement in a first display mode on the display unit as well as displays a music playing movement image corresponding to a case of not displaying the specific movement in a second display mode, which is different from the first display mode, on the display unit.

Furthermore, a storage medium, according to one aspect of the present invention, stores a program therein to instruct a computer used in a music playing movement display device including a memory that stores (a) music playing information that includes a sound production starting time, a sound continuation time, a pitch, and a finger used, (b) a structural data group including a plurality of kinds of structural data and structure-relation data that determines the relevance between the structural data, and (c) movement information that shows information of the structural data corresponding to the sound production starting time and serving as an origin when displaying a plurality of the structural data, to execute the steps of: determining whether to display a specific movement; and controlling to display a music playing movement image on a display unit based on the music playing information, the movement information, and the structural data group stored in the memory, and when the step of determining determines to display the specific movement, displays a music playing movement image corresponding to the specific movement in a first display mode on the display unit and displays a music playing movement image corresponding to a case of not displaying the specific movement in a second display mode, which is different from the first display mode, on the display unit.

BRIEF DESCRIPTION OF THE DRAWINGS

FIG. 8 is a diagram showing a structure of movement information;

FIG. 18 is a diagram showing a structure of movement information referenced in enlarged music playing movement display;

FIG. 21 is a diagram showing a structure of control variables referenced when performing music playing movement display including music playing technique display;

FIG. 22 is a diagram showing a structure of music playing information referenced when performing music playing movement display including music playing technique display;

DETAILED DESCRIPTION OF THE INVENTION

In the following, embodiments of the present invention are explained with reference to the drawings.

Figure 1:
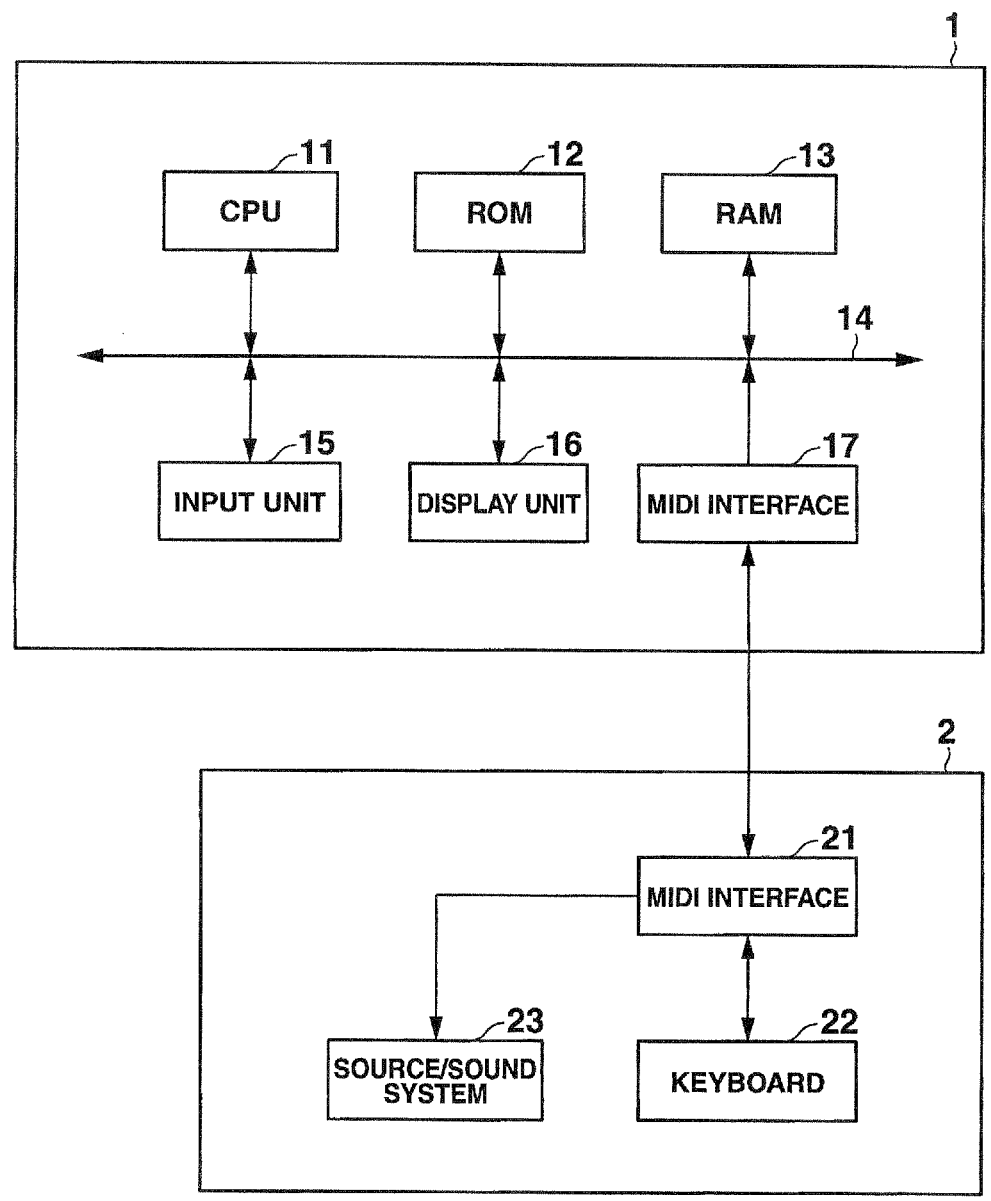
FIG. 1 is a block diagram showing a hardware configuration of a music playing movement display device and an electronic instrument.

FIG. 1 is a block diagram showing a hardware configuration of a music playing movement display device and an electronic instrument according to one embodiment of the present invention.

A music playing movement display device 1 is provided with a display unit, for example.

The music playing movement display device 1 is provided with a CPU (Central Processing Unit) 11, ROM (Read Only Memory) 12, RAM (Random Access Memory) 13, a bus 14, an input unit 15, a display unit 16, and a MIDI (Musical Instrument Digital Interface) interface 17.

The CPU 11 controls the overall music playing movement display device 1 and executes various processing in accordance with programs stored in the ROM 12 or programs read from the ROM 12 into the RAM 13.

The ROM 12 stores processing programs for various processing executed by the CPU 11. Furthermore, the RAM 13 stores programs and the like read from the ROM 12.

The CPU 11, ROM 12, and RAM 13 are connected to each other via the bus 14. Furthermore, the input unit 15, display unit 16, and MIDI interface 17 are also connected to the bus 14.

The input unit 15 is configured with buttons and the like, for example, and receives the input of various information in accordance with an operational instruction from a user.

The display unit 16 displays information and the like relating to various setting information and music playing movements in accordance with the control by the CPU 11.

The MIDI interface 17 is connected to the electronic instrument 2. The MIDI interface 17 sends music playing data relating to a sample music performance and the like to the electronic instrument 2.

The electronic instrument 2 is provided with a MIDI interface 21, a keyboard 22, and a sound source/sound system 23.

The MIDI interface 21 receives music playing data relating to a sample music performance and the like from the music playing movement display device 1, and outputs a music playing signal corresponding to this music playing data to the sound source/sound system. Furthermore, the MIDI interface 21 receives an operation input of an instrument from the keyboard 22 and outputs a music playing signal corresponding to this operation input to the sound source/sound system.

The sound source/sound system 23 is connected to the interface MIDI 21 and outputs a sound of an instrument or the like based on the signal output from the MIDI interface.

Figure 2A:
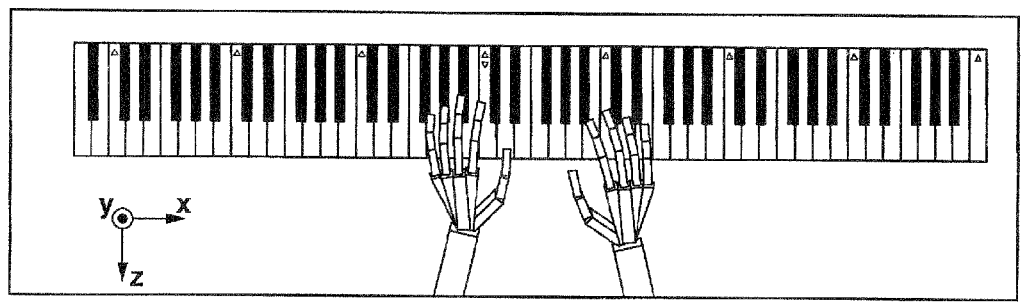
FIGS. 2A to 2C are diagrams illustrating examples of the music playing movement display.
Figure 2B:
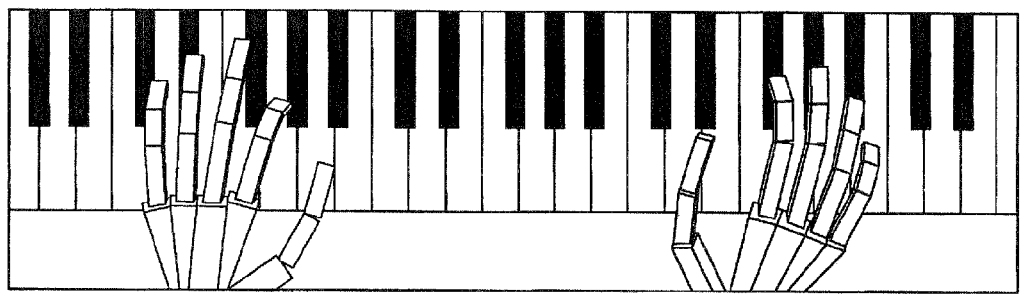
Figure 2C:
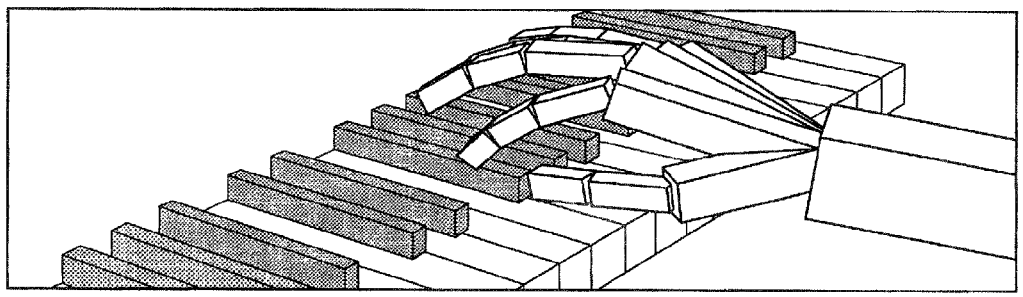

Such a music playing movement display device 1 displays on the display unit 16 a sample movement of an arm, hand, and fingers while playing music, in order to aid in improving a user's music playing. In addition, it should be noted that a display of the movement of an arm, hand, and fingers while playing music on the display unit 16 as shown in FIG. 2A is hereinafter referred to as normal music playing movement display. Furthermore, enlarged display of the movement of an arm, hand, and fingers while playing music on the display unit 16 as shown in FIG. 2B is hereinafter referred to as enlarged music playing movement display. Furthermore, the enlarged display of an arm, hand, and fingers while playing music as shown in FIG. 2C from a diagonal direction is referred to as music playing technique display.

In addition, in the following explanation, a lateral direction in a case of visually observing the keyboard as shown in FIG. 2A from the front face (direction of keys from low pitch to high pitch) is an x-axis direction; a direction extending toward the keyboard from the front face in a case of visually observing the keyboard from the front face is a y-axis direction; and an upwards direction in a case of visually observing the keyboard from the front face is a z-axis direction.

Figures 3, 4:
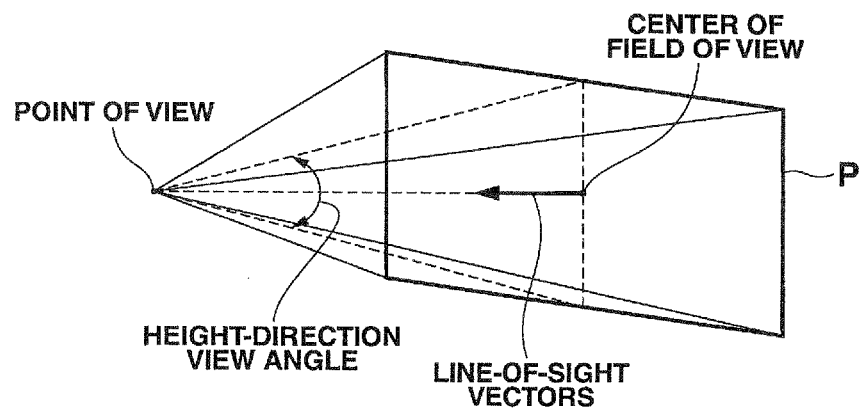
FIG. 3 is a diagram listing each term used when performing music playing movement display on a display unit.
FIG. 4 is a diagram showing a structure of control variables.

FIG. 3 is a diagram providing explanations for each term used when performing music playing movement display on the display unit 16.

First, an image displayed on the display unit 16 is a field of view P. A center position of this field of view P is referred to as a center of field of view. Then, a vector extending toward a point of view in a case of performing rendering from the center of the field of view is referred to as a line-of-sight vector. Furthermore, when drawing lines from the point of view to the center in a width direction from an upper end and a lower end of the field of view, an angle at which these lines intersect is referred to as a height-direction view angle.

First, the information necessary for normal music playing movement display is explained. The information necessary for this music playing movement display is stored in the ROM 12. This information is copied as appropriate from the ROM 12 by the CPU 11 and temporarily stored in the RAM 13.

FIG. 4 is a diagram showing a structure of control variables. These control variables are used for performing normal music playing movement display and enlarged music playing movement display in the music playing movement display device 1.

For the control variables, width, height, f0vy, center[3], Eye[3], EyeVector[3], NoteR[ ], StructR[ ], MotionR[ ], IndexR, NoteL[ ], StructL[ ], MotionL[ ], and IndexL are defined as variables.

In addition, in the diagram showing a structure, variables with [ ] at the end as a suffix suggest a sequence. For example, Center[3] is a sequence composed of three variables. Furthermore, in the diagram showing the structure, a sequence with the number of elements in the sequence blank indicates that the number thereof differs depending on the music to be played.

Herein, width is a variable representing the width of a screen displayed on the display unit 16.

Herein, height is a variable representing the height of a screen displayed on the display unit 16.

Herein, f0vy is a variable representing a height-direction view angle (please refer to FIG. 3).

Center[3] is a variable representing the center coordinates of a field of view on the screen displayed on the display unit 16. Center[3] includes each coordinate value in a three dimensional coordinate system (x, y, z) for each element and represents a position in the three dimensional coordinate system.

Eye[3] is a variable representing a point of view on the screen displayed on the display unit 16. This variable, Eye, represents a position in the three dimensional coordinate system, similarly to Center.

EyeVector[3] is a variable representing a line-of-sight vector. EyeVector[3] is obtained by subtracting Center[3] from Eye[3].

NoteR[ ] is a sequence variable in which music playing information by a right hand is stored. A detailed description thereof will be provided later.

StructR[ ] is a sequence variable in which structure data of a right hand is stored. The structure data is a diagram illustrating the structure of fingers, a hand, and an arm. This structure data is used for rendering fingers, a hand, and an arm on the screen displayed on the display unit 16.

MotionR[ ] is a sequence variable in which movement information representing a movement of a right hand while playing music is stored.

IndexR is a variable representing an index of movement information of a right hand, which is a target for rendering.

NoteL[ ] is a sequence variable in which music playing information by a left hand is stored. The variable stored in NoteL[ ] is the same as that in NoteR[ ].

StructL[ ] is a sequence variable in which structure data of a left hand is stored. The variable stored in StructL[ ] is the same as that in StructR[ ].

MotionL[ ] is a sequence variable in which movement information representing the movement of a left hand during playing music is stored. The variable stored in MotionL[ ] is the same as that in MotionR[ ].

IndexL is a variable representing an index of movement information of a left hand, which is a target for rendering.

Figure 5:
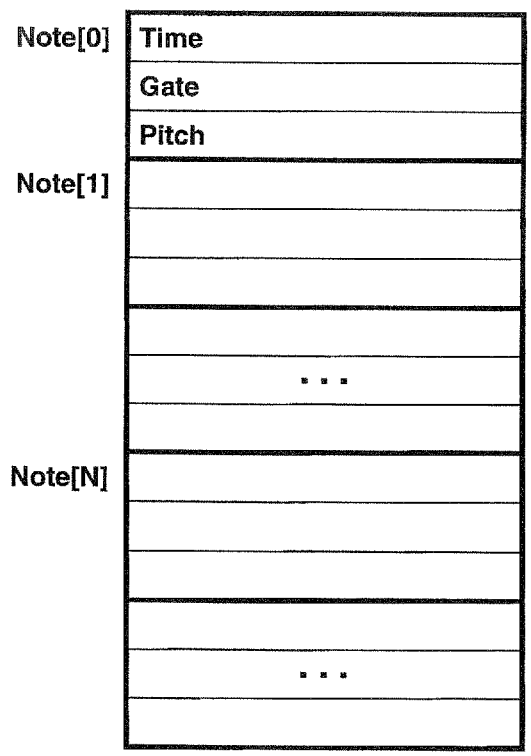
FIG. 5 is a diagram showing a structure of music playing information.

FIG. 5 is a diagram showing a structure of music playing information.

As described above, the music playing information is configured from NoteR[ ] representing music playing information by a right hand and NoteL[ ] representing music playing information by a left hand.

Since NoteR[ ] and NoteL[ ] are the same in configuration, this NoteR[ ] and NoteL[ ] are collectively referred to as Note[ ] in FIG. 5.

As shown in FIG. 5, each element in Note[ ] (Note[0], Note[1], . . . Note[N] . . . ) defines Time, Gate, and Pitch, respectively. It should be noted that, in the following explanation, sequence variables with different suffixes shall be defined as having the same variable unless otherwise stated. For example, in FIG. 5, although Time, Gate, and Pitch are defined only in Note[0], Time, Gate and Pitch shall also be defined similarly in the other variables (Note[1], Note[N], etc.).

Time is a variable representing the time when a sound starts.

Gate is a variable representing a time for which a sound continues.

Pitch is a variable representing a pitch of a sound generated (frequency).

Figure 6:
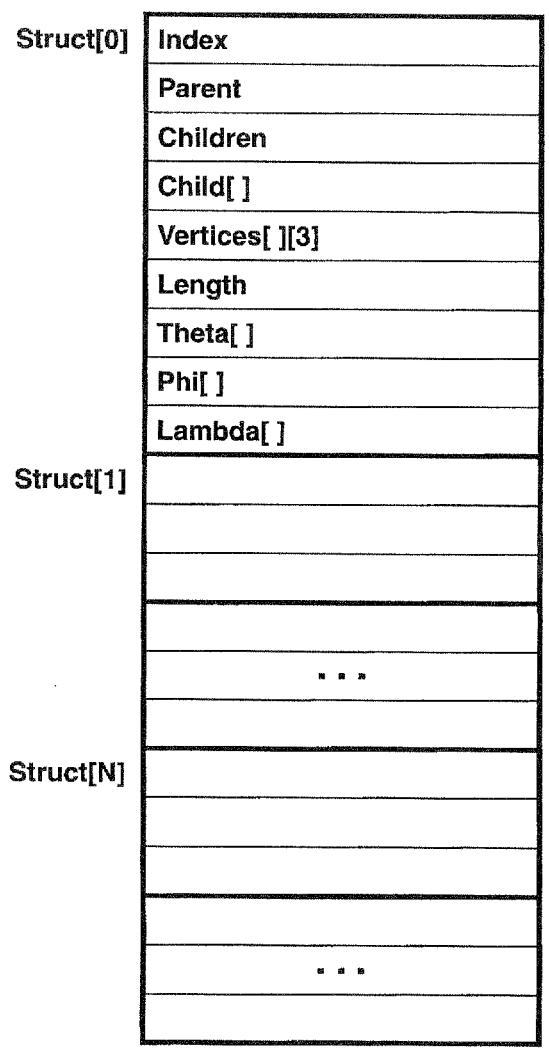
FIG. 6 is a diagram showing a structure of structure data.

FIG. 6 is a diagram showing the structure of structure data.

As described above, the structure data is configured from StructR[ ] representing structure data of a right hand and StructL[ ] representing structure data of a left hand.

Since StructR[ ] and StructL[ ] are the same in configuration, this StructR[ ] and StructL[ ] are collectively referred to as Struct[ ] in FIG. 6.

As shown in FIG. 6, each element in Struct[ ] defines Index, Parent, Children, Child[ ], Vertices[ ][3], Length, Theta[ ], Phi[ ], and Lambda[ ], respectively.

Index is a variable representing an index of the structure data.

Parent is a variable representing an index of the structure data serving as parent data. For example, when the value of Parent is 2, the structure data of which the index is 2 becomes parent data. In addition, it should be noted that, when the value of Parent is −1, it indicates that there is no parent data.

Children is a variable representing the number of structures of children with respect to a parent structure.

Vertices[ ][3] is a sequence variable representing a parent structure and the three-dimensional coordinates of each vertex of a polygon displayed on the display unit 16. [ ] of Vertices[ ][3] corresponds to the number of vertices of a polygon and the number of elements equal to the number of vertices is defined. Furthermore, [3] of Vertices[ ][3] corresponds to the three dimensional coordinates for each vertex.

Length is a variable representing a length of a parent structure.

Theta[ ] is a variable representing an x-axis rotation angle of a parent structure, and is the same number of elements as the number of elements of the movement information as described later is defined.

Phi[ ] is a variable representing a y-axis rotation angle of a parent structure, and the same number of elements as the number of elements of the movement information as described later is defined.

Lambda[ ] is a variable representing a z-axis rotation angle of a parent structure, and the same number of elements as the number of elements of the movement information as described later is defined.

Figure 7:
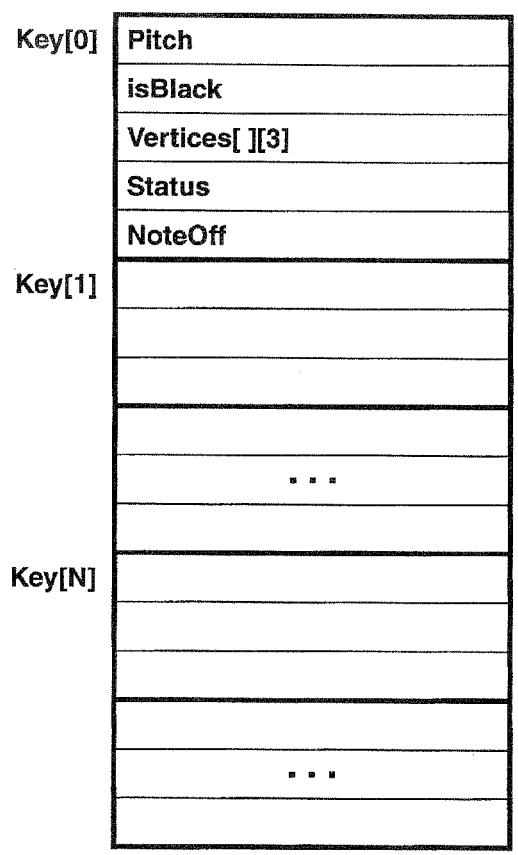
FIG. 7 is a diagram showing a structure of keyboard data.

FIG. 7 is a diagram showing a structure of keyboard data.

Key[ ] as keyboard data stores the respective information of white keys and black keys that constitute a keyboard displayed on the display unit 16. In Key[ ], information for each key in the order of key tone from the lowest is stored. For example, Key[0] corresponds to a white key located at a leftmost position, and Key[1] corresponds to a key of which the tone is higher than the white key by half tone.

As shown in FIG. 7, in each element in Key[ ], Pitch, isBlack, Vertices[ ][3], Status, and NoteOff are defined.

Pitch is a variable representing the pitch of a sound to be generated (frequency).

isBlack is a flag representing a white key or a black key. More specifically, isBlack represents a white key when 0 and a black key when 1.

Vertices[ ][3] is a sequence variable representing structure data of a key (polygon data) and the three dimensional coordinates of each vertex of a polygon displayed on the display unit 16.

Status is a variable representing a status of a key. For example, Status represents a key releasing status when 0, represents a keying status when +, and represents a key being released status when −.

NoteOff is a variable representing a mute time, which is a time from a sound being generated until being muted.

Figure 8:
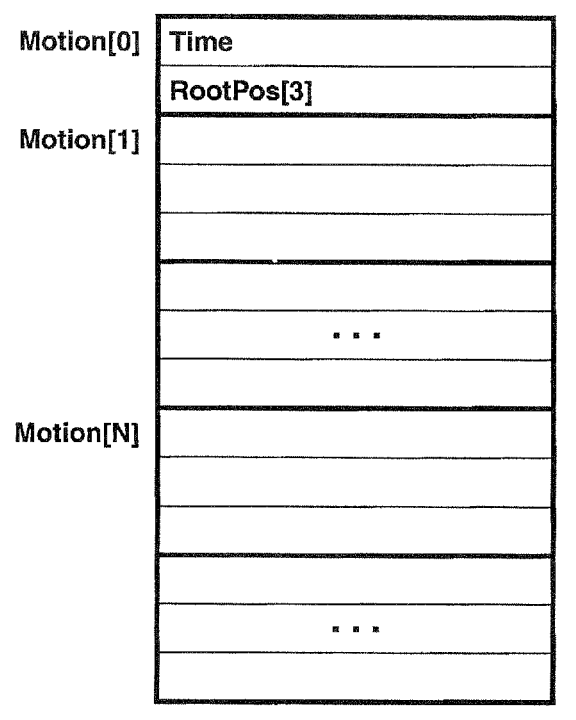

FIG. 8 is a diagram showing the structure of movement information.

As described above, the movement information is configured from MotionR[ ] representing movement information of a right hand and MotionL[ ] representing movement information of a left hand.

Since MotionR[ ] and MotionL[ ] are the same in configuration, this MotionR[ ] and MotionL[ ] are collectively referred to as Motion[ ] in FIG. 8.

As shown in FIG. 8, Time and RootPos[3] are defined for each element in Motion[ ].

Time is a variable representing the time when each frame is started while playing music.

RootPos[3] is the three dimensional coordinates of a structure serving as a point of origin when displaying the structure on the display unit 16 (three dimensional coordinates of a joint point of origin).

A flow for the processing of music playing movement display is then explained.

Figure 9:
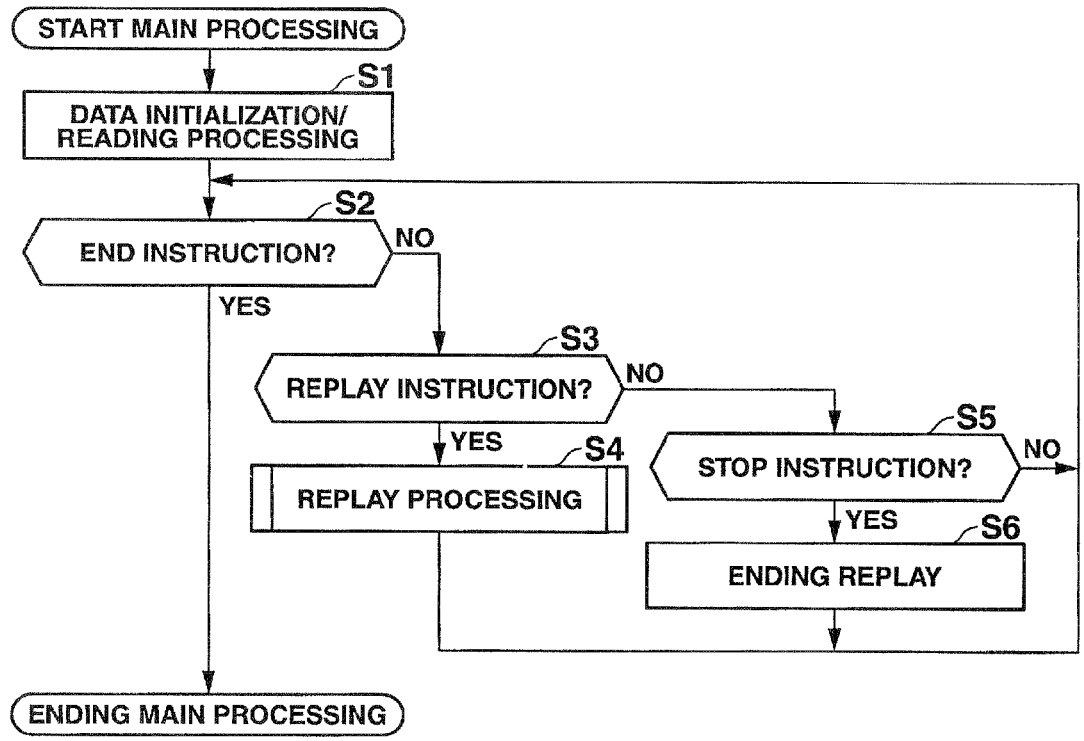
FIG. 9 is a flowchart showing a flow of main processing of music playing movement display.

FIG. 9 is a flowchart showing the flow of main processing of music playing movement display. This main processing is common in normal music playing movement display, enlarged music playing video display, and music playing technique display.

In Step S1, the CPU 11 performs data initialization/reading processing.

That is to say, the CPU 11 performs initialization of data temporarily stored in the RAM 13, reads various information stored in the ROM 12, and then receives an instruction from a user via the input unit 15. The various information includes a control variable, music playing information, structure data, keyboard data, and movement information.

In Step S2, the CPU 11 determines whether it has received an end instruction from a user via the input unit 15. In the case of a Yes determination, the CPU 11 ends the main processing, and in the case of a No determination, the CPU 11 advances the processing to Step S3.

In Step S3, the CPU 11 determines whether it has received an instruction to replay music from a user via the input unit 15. In the case of a Yes determination, the CPU 11 advances the processing to Step S4, and in the case of a No determination, the CPU 11 advances the processing to Step S5.

In Step S4, the CPU 11 performs replay processing of music instructed by a user. The details of replay processing are described in detail with reference to FIG. 10. When the processing of Step S4 ends, the CPU 11 advances the processing to Step S2.

In Step S5, the CPU 11 determines whether it has received a replay stop instruction from a user via the input unit 15. In the case of a Yes determination, the CPU 11 advances the processing to Step S6, and in the case of a No determination, the CPU 11 advances the processing to Step S2.

In Step S6, the CPU 11 ends the replay of the music being played. When the processing of Step S6 ends, the CPU 11 advances the processing to Step S2.

Figure 10:
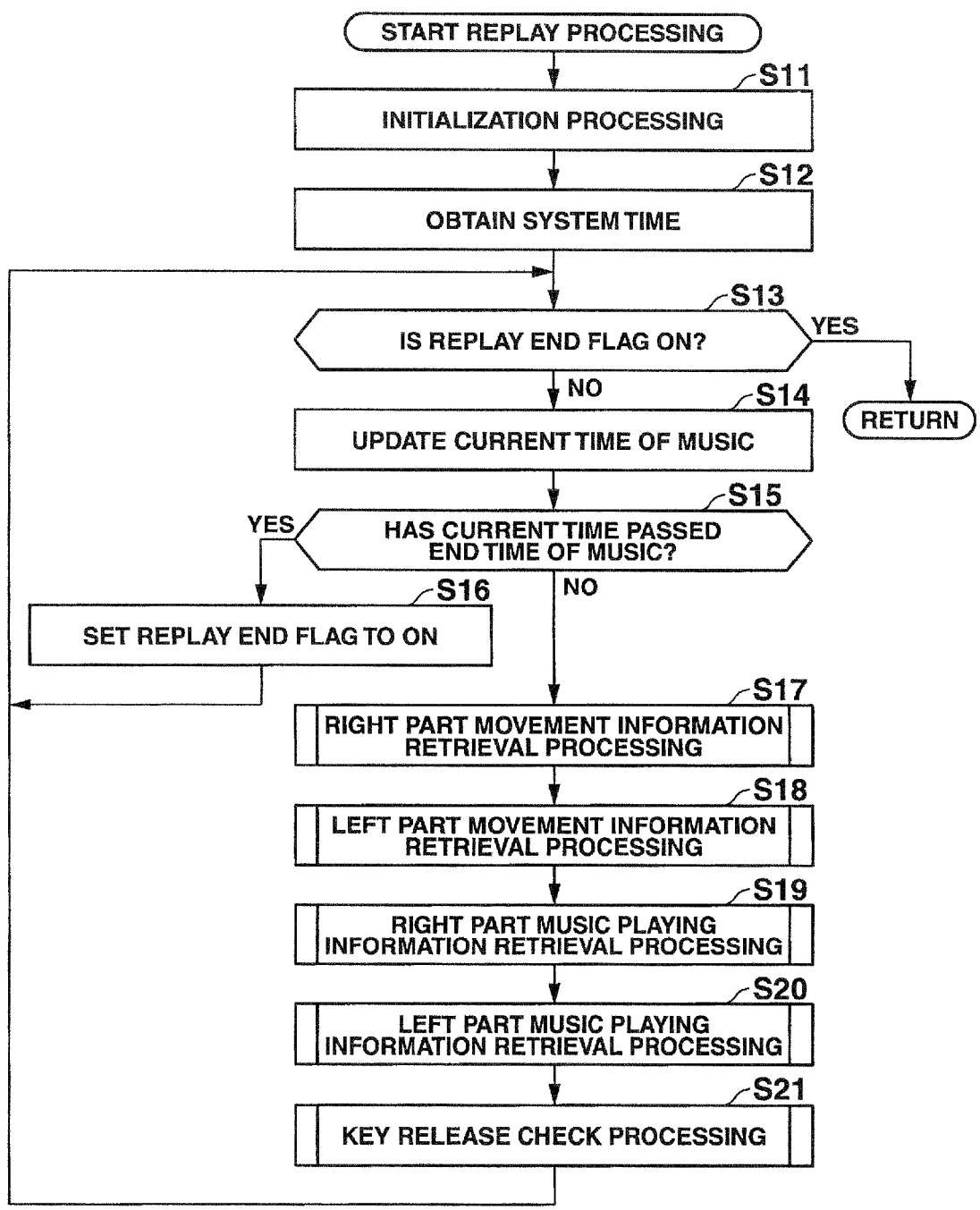
FIG. 10 is a flowchart showing a flow of replay processing.

FIG. 10 is a flowchart showing the flow of replay processing.

In Step S11, the CPU 11 performs initialization processing.

That is to say, the CPU 11 performs initialization of music playing information in response to the replay processing being started. The initialization of music playing information as used here means storing a control variable, keyboard data, music playing information, structure data, and movement information in the RAM 13. Here, the music playing information, structure data, and movement information are set to correspond to the music, which is instructed to be replayed in Step S3 of FIG. 9. The CPU 11 also stores a replay end flag in the RAM 13 in the initialization processing. An initial value of the replay end flag is set to be OFF.

In Step S12, the CPU 11 obtains a system time from a timer (not illustrated).

In Step S13, the CPU 11 determines the status of the replay end flag stored in the RAM 13. The CPU 11 ends the replay processing when the replay end flag is ON. When the replay end flag is OFF, the CPU advances the processing to Step S14.

In Step S14, the CPU 11 updates a current time (replay position) of music being replayed.

In Step S15, the CPU 11 determines whether the current time that is updated in Step S14 exceeds an end time of the music being replayed. In the case of a YES determination, the CPU 11 advances the processing to Step S16, and in the case of a NO determination, the CPU 11 advances the processing to Step S17.

In Step S16, the CPU 11 updates the replay end flag stored in the RAM 13 to be ON. When the processing of Step S16 ends, the CPU 11 advances the processing to Step S13.

In Step S17, the CPU 11 performs right hand part movement information retrieval processing, which is processing for retrieving movement information of a right hand part. The details of the right hand part movement information retrieval processing are described in detail with reference to FIG. 11.

In Step S18, the CPU 11 performs left hand part movement information retrieval processing, which is processing for retrieving movement information of a left hand part. The details of the left hand part movement information retrieval processing are described in detail with reference to FIG. 11.

In Step S19, the CPU 11 performs right-hand-part music playing information retrieval processing, which is processing for retrieving music playing information of a right hand part. The details the right-hand-part music playing information retrieval processing are described in detail with reference to FIG. 12.

In Step S20, the CPU 11 performs left-hand-part music playing information retrieval processing, which is processing for retrieving music playing information of a left hand part. The details of the left-hand-part music playing information retrieval processing are described in detail with reference to FIG. 12.

In Step S21, the CPU 11 performs key release check processing. The details of key releasing check processing are described in detail with reference to FIG. 13. When the processing of Step S21 ends, the CPU 11 advances the processing to Step S13.

Figure 11:
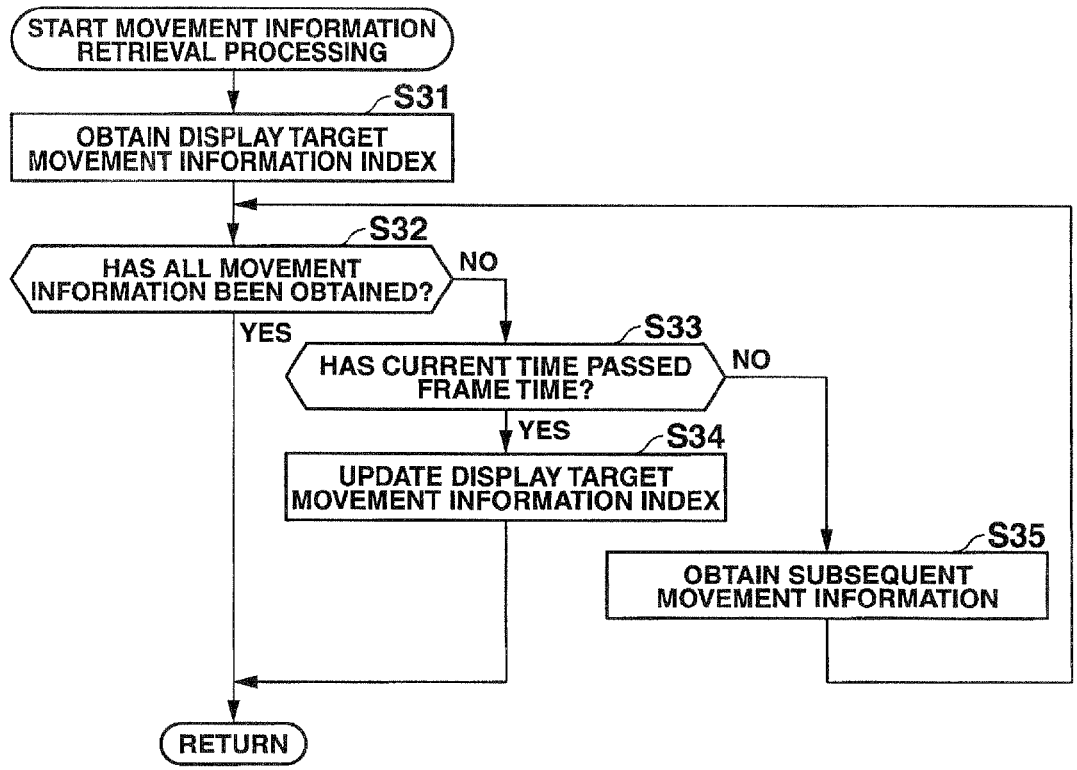
FIG. 11 is a flowchart showing a flow of movement information retrieval processing.

FIG. 11 is a flowchart showing the flow of movement information retrieval processing.

In addition, it should be noted that the CPU 11 retrieves MotionR[ ] in a case of performing right-hand-part movement information retrieval processing and retrieves MotionL[ ] in a case of performing left-hand-part movement information retrieval processing. In addition, it should also be noted that Motion[ ] described in this flowchart is replaced by MotionR[ ] in a case of performing right-hand-part movement information retrieval processing and is replaced by MotionL[ ] in a case of performing left-hand-part movement information retrieval processing.

In Step S31, the CPU 11 obtains a display target movement information index of the control variable (handCtrl) stored in the RAM 13. Here, when the CPU 11 performs the right-hand-part movement information retrieval processing, the CPU 11 obtains IndexR, and when the CPU 11 performs the left-hand-part movement information retrieval processing, the CPU 11 obtains IndexL.

In Step S32, the CPU 11 determines whether it has obtained all of the movement information based on the display target movement information index thus obtained. That is to say, the CPU 11 determines whether the display target movement information index is equal to a maximum value of the suffix of Motion[ ]. In the case of a YES determination, the CPU 11 ends the movement information retrieval processing, and in a case f a NO determination, the CPU 11 advances the processing to Step S33.

In Step S33, the CPU 11 determines whether the current time updated in Step S14 of FIG. 10 has passed the frame time of Motion[ ]. In the case of a YES determination, the CPU 11 advances the processing to Step S34, and in the case of a NO determination, the CPU 11 advances the processing to Step S35.

In Step S34, the CPU 11 updates the display target movement information index of the control variable (handCtrl) stored in the RAM 13. That is to say, the CPU 11 updates the display target movement information index by incrementing the value of the display target movement information index obtained in Step S31.

In Step S35, the CPU 11 obtains subsequent movement information. When the CPU 11 ends this processing, the CPU 11 advances the processing to Step S32.

Figure 12:
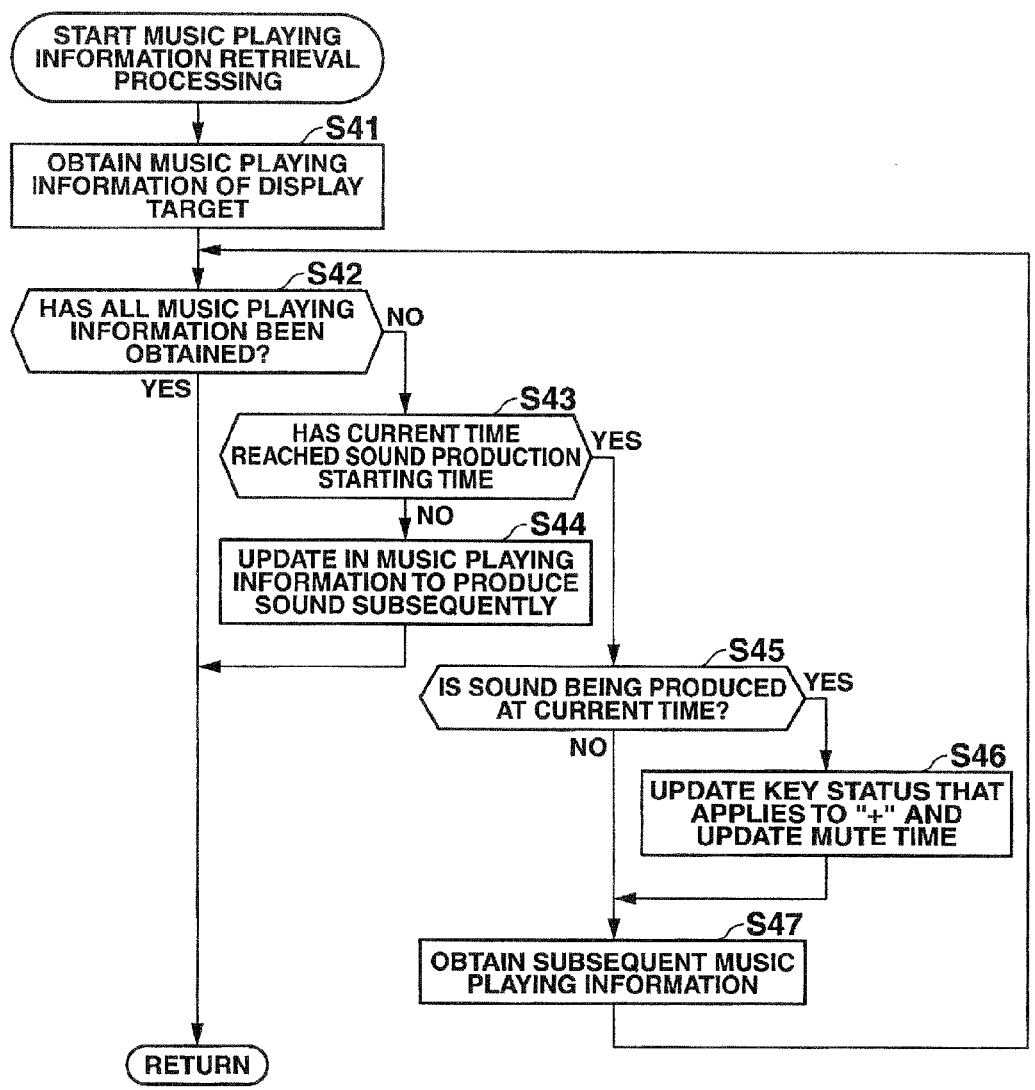
FIG. 12 is a flowchart showing a flow of music playing information retrieval processing.

FIG. 12 is a flowchart showing the flow of music playing information retrieval processing.

In addition, it should be noted that Note[ ] described in this flowchart is replaced by NoteR[ ] in a case of performing right-hand-part movement information retrieval processing and is replaced by NoteL[ ] in a case of performing left-hand-part movement information retrieval processing.

In Step S41, the CPU 11 obtains Note[ ] as music playing information targeted for display from a control variable (handCtrl) stored in the RAM 13.

In Step S42, the CPU 11 determines whether the CPU 11 obtained all of the music playing information based on the music playing information targeted for display that was obtained in Step S41. That is to say, the CPU 11 determines whether the suffix of Note[ ] is equal to a maximum value of the suffix of Note[ ] stored in the ROM 12. In the case of a YES determination, the CPU 11 ends the music playing information retrieval processing, and in the case of a NO determination, the CPU 11 advances the processing to Step S43.

In Step S43, the CPU 11 determines whether the current time updated in Step S14 of FIG. 10 reached a sound production start time of Note[ ]. In the case of a YES determination, the CPU 11 advances the processing to Step S45, and in the case of a NO determination, the CPU 11 advances the processing to Step S44.

In Step S44, the CPU 11 updates the music playing information saved in the control variable (handCtrl) stored in the RAM 13 to music playing information to produce a sound subsequently. More specifically, the CPU 11 increments the suffix of Note[ ] obtained in Step S41 and obtains from the RAM 13 the information of Note[ ] in which the suffix was incremented. Then, the CPU 11 rewrites the control variable (handCtrl) stored in the RAM 13 to the information of Note[ ] thus obtained.

In Step S45, the CPU 11 determines whether the sound was produced at the current time updated in Step S14 of FIG. 10. In the case of a YES determination, the CPU 11 advances the processing to Step S46, and in the case of a NO determination, the CPU 11 advances the processing to Step S42.

In Step S46, the CPU 11 updates the status of a corresponding key (Status) in the keyboard data (Key[ ]) stored in the RAM 13 to "+" (pressed-key status) as well as updates a mute time (NoteOff) in the keyboard data. Here, the CPU 11 refers to Pitch of the music playing information stored in the control variable and specifies a key corresponding to the Pitch of Note[ ] obtained in Step S44.

In Step S47, the CPU 11 obtains subsequent music playing information. When the CPU 11 ends this processing, the CPU 11 advances the processing to Step S42.

Figure 13:
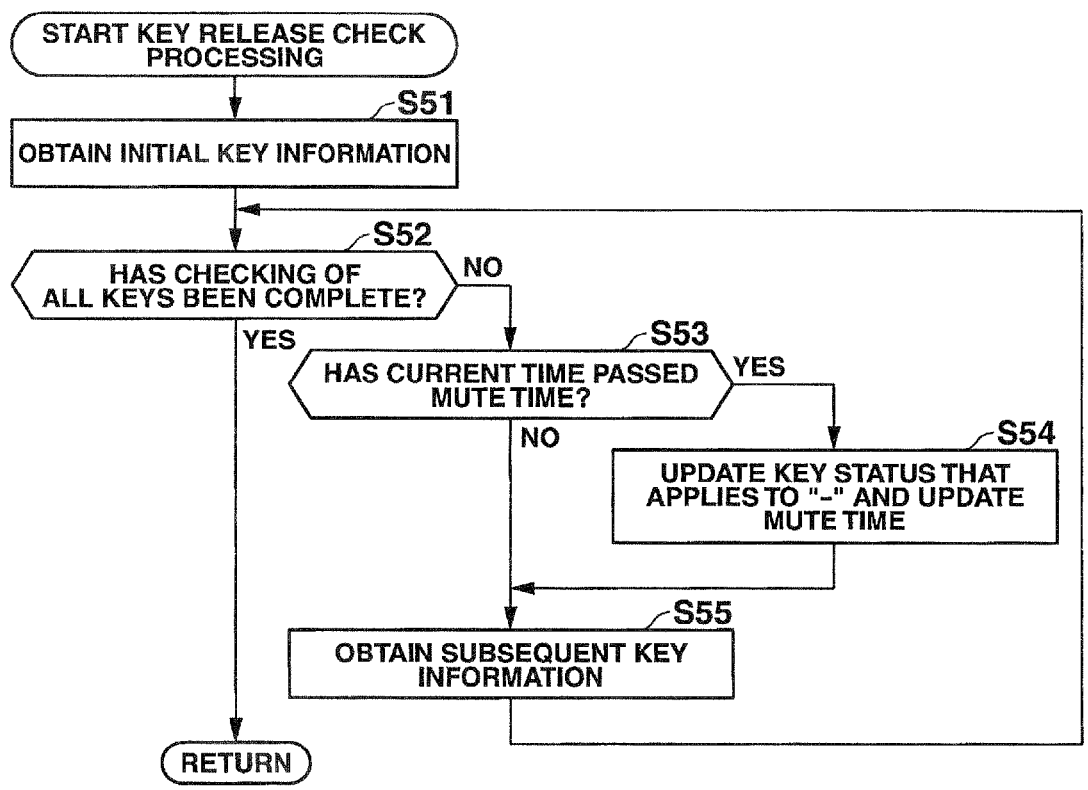
FIG. 13 is a flowchart showing a flow of key-release check processing.

FIG. 13 is a flowchart showing key release check processing.

In Step S51, the CPU 11 obtains initial key information from the keyboard data (Key[ ]) stored in the RAM 13. Here, the initial key information refers to the lowest key information (Key[0]), for example.

In Step S52, the CPU 11 determines whether the checking of all of the key information has been completed. That is to say, the CPU 11 determines whether a suffix of Key[ ] is equal to the maximum suffix of Key[ ] stored in the ROM 12. In the case of a YES determination, the CPU 11 ends the key release check processing, and in the case of a NO determination, the CPU 11 advances the processing to Step S53.

In Step S53, in a case in which the time is stored for the mute time included in the key information obtained in Step S51 or Step S55, the CPU 11 determines whether the current time updated in Step S14 of FIG. 10 has passed the mute time. In the case of a YES determination, the CPU 11 advances the processing to Step S54, and in the case of a NO determination, the CPU 11 advances the processing to Step S55.

In Step S54, the CPU 11 updates the status of a corresponding key (Status) to "−" (a key release status) as well as erasing the mute time (NoteOff) in the keyboard data. When the processing of Step S54 ends, the CPU 11 advances the processing to Step S55.

In Step S55, the CPU 11 obtains subsequent key information. When the processing of Step S55 ends, the CPU 11 advances the processing to Step S52.

Figure 14:
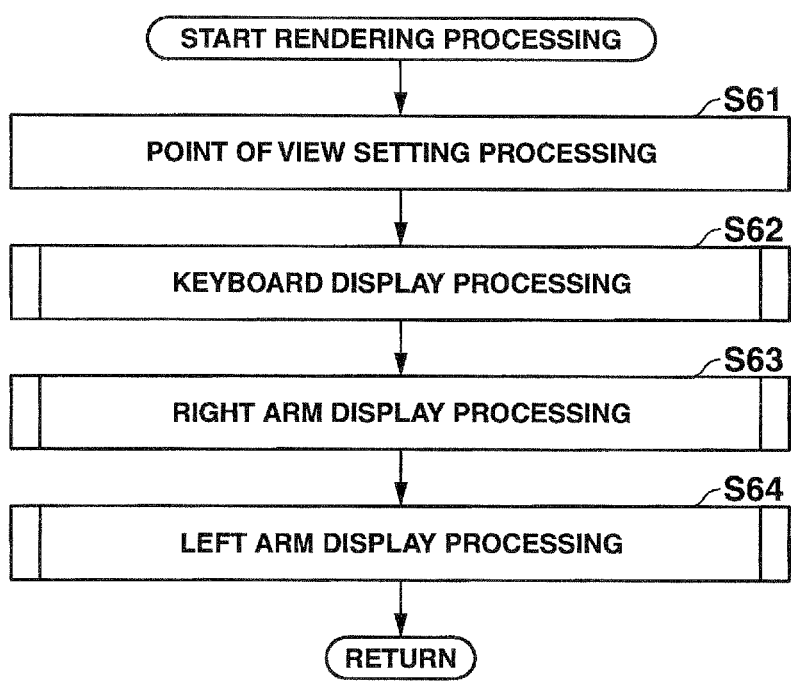
FIG. 14 is a flowchart showing a flow of rendering processing.

FIG. 14 is a flowchart showing the flow of rendering processing. It should be noted that the rendering processing is performed continuously after the data initialization/reading processing of Step S1 in the main processing explained in FIG. 9 has completed.

In Step S61, the CPU 11 performs point-of-view setting processing.

That is to say, the CPU 11 sets a point of view on a screen displayed on the display unit 16 based on a height-direction view angle (f0vy) stored in a control variable (handCtrl) stored in the RAM 13, a center coordinate of a view (Center [3]), and a point of view (Eye[3]).

In Step S62, the CPU 11 performs keyboard display processing. The details of keyboard display processing are described in detail with reference to FIG. 15.

In Step S63, the CPU 11 performs right arm display processing. The details of right arm display processing are described in detail with reference to FIG. 16.

In Step S64, the CPU 11 performs left arm display processing. The details of left arm display processing are described in detail with reference to FIG. 16.

Figure 15:
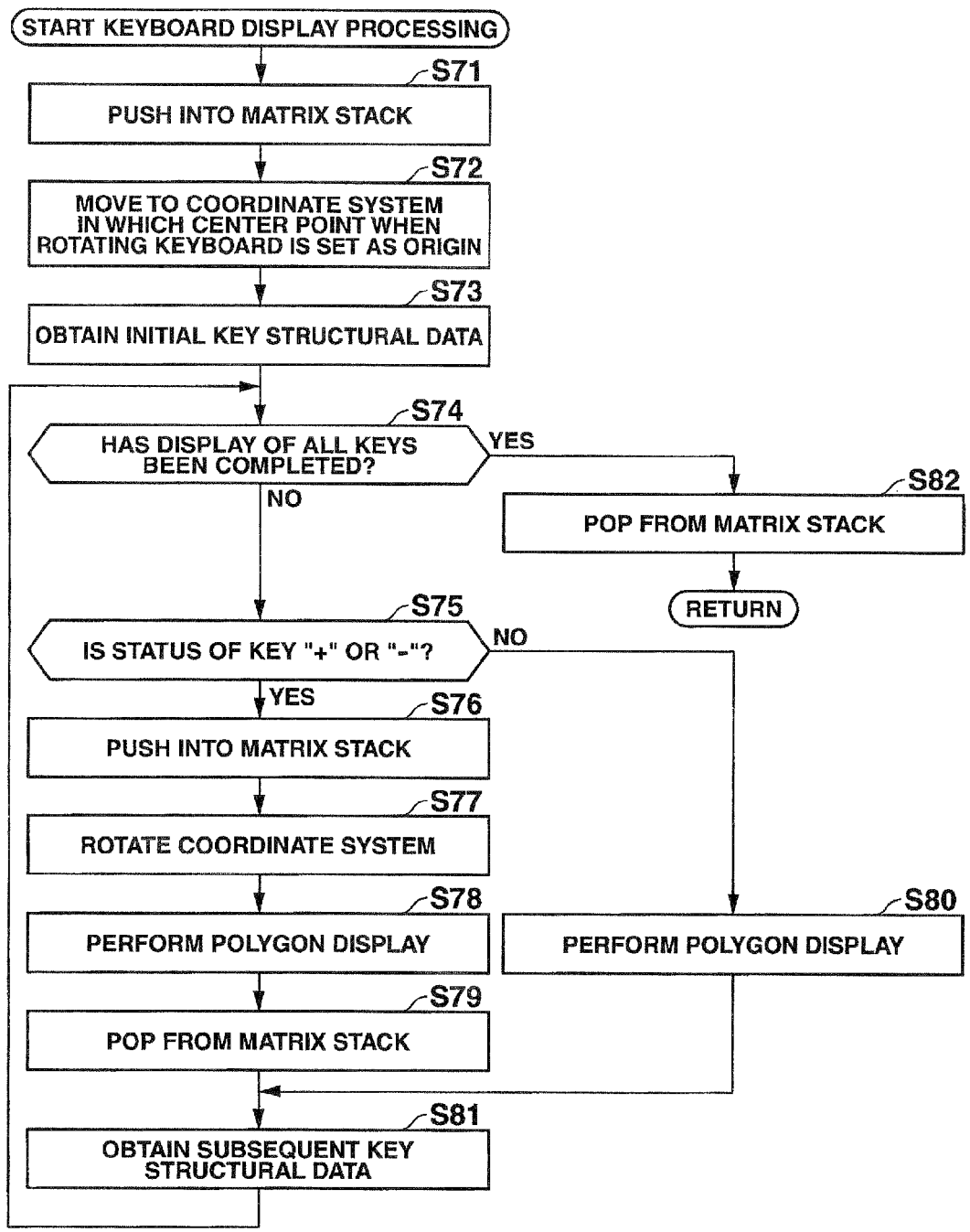
FIG. 15 is a flowchart showing a flow of keyboard display processing.

FIG. 15 is a flowchart showing the flow of the keyboard display processing.

In Step S71, the CPU 11 pushes structural data of keys into matrix stack in order to display a keyboard.

In Step 72, the CPU 11 moves to a coordinate system in which a center point when rotating a keyboard is set to be the origin.

In Step S73, the CPU 11 obtains initial key structural data from the keyboard data (Key[ ]) stored in the RAM 13. Here, the initial key structural data refers to structural data (Vertices[ ]) corresponding to the lowest key information (Key[0]), for example.

In Step S74, the CPU 11 determines whether the display of all of the keys is completed. In the case of a YES determination, the CPU 11 advances the processing to Step S82, and in the case of a NO determination, the CPU 11 advances the processing to Step S75.

In Step S75, the CPU 11 determines whether the status of a key corresponding to the key structural data thus obtained is "+" (pressed key status) or "−" (released key status). In the case of a YES determination, the CPU 11 advances the processing to Step S76, and in the case of a NO determination, the CPU 11 advances the processing to Step S80.

In Step S76, the CPU 11 pushes the key structural data obtained in Step S73 or Step S81 into the matrix stack. Here, the matrix stack refers to a data structure used for performing 3D rendering of structural data.

In Step S77, the CPU 11 rotates a coordinate system of the structural data that is pushed into the matrix stack in Step S76 by a predetermined angle. By being displayed with this status, the key status is displayed in such a way that a key in a "+" status (pressed key status) or a "−" status (released key status) is being keyed.

In Step S78, the CPU 11 performs polygon display of the key structural data that is pushed into the matrix stack.

In Step S79, the CPU 11 pops (clears) the key structural data that was pushed in Step S76.

In Step S80, the CPU 11 performs polygon display of the key structural data that was pushed into the matrix stack.

In Step S81, the CPU 11 obtains subsequent key structural data. It should be noted that, in a case in which the key structural data obtained immediately before is the final key (highest key), the CPU 11 maintains a state obtaining the key structural data thus obtained being obtained. When the processing of Step S81 ends, the CPU 11 advances the processing to Step S74.

In Step S82, the CPU 11 pops (clears) the key structural data that was pushed in Step S71.

Figure 16:
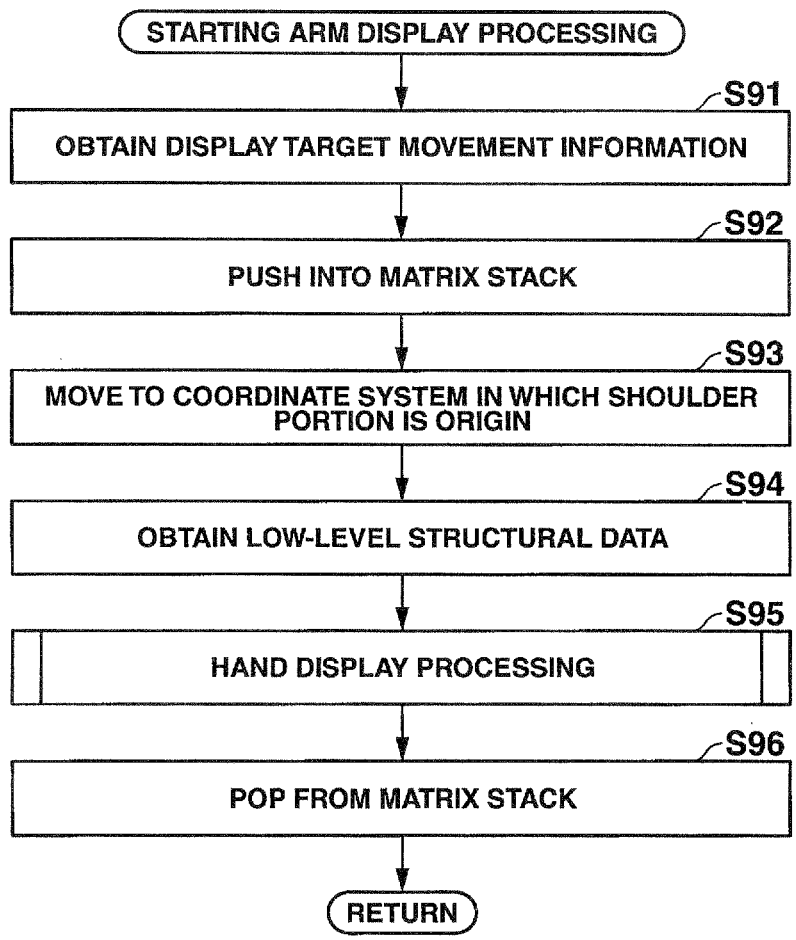
FIG. 16 is a flowchart showing a flow of arm display processing.

FIG. 16 is a flowchart showing the flow of arm display processing. In addition, it should be noted that, Motion[ ] described in this flowchart is replaced by MotionR[ ] in a case of performing right arm display processing and is replaced by MotionL[ ] in a case of performing left arm display processing.

In Step S91, the CPU 11 obtains display target movement information from the movement information (Motion[ ]) stored in the RAM 13. That is to say, the CPU 11 obtains the three dimensional coordinates of a structure that is set to be an origin when displaying the structure on the display unit 16, from RootPos[3] stored in Motion[ ].

In Step S92, the CPU 11 obtains, and pushes into the matrix stack, the structural data of the structure (right arm or left arm) that is set to be an origin obtained in Step S91. In Step S93, the CPU 11 moves to the coordinate system in which a shoulder position is an origin in order to display from the shoulder position.

In Step S94, the CPU 11 refers to Child[ ] of the structural data (Struct[ ]) stored in the RAM 13 and obtains low-level structural data. Here, the CPU 11 obtains structural data of a right hand or a left hand.

In Step S95, the CPU 11 performs hand/finger video processing. The details of hand/finger video processing are described in detail with reference to FIG. 17.

In Step S96, the CPU 11 pops the structural data of the structure (a right arm or a left arm) being pushed into the matrix stack.

Figure 17:
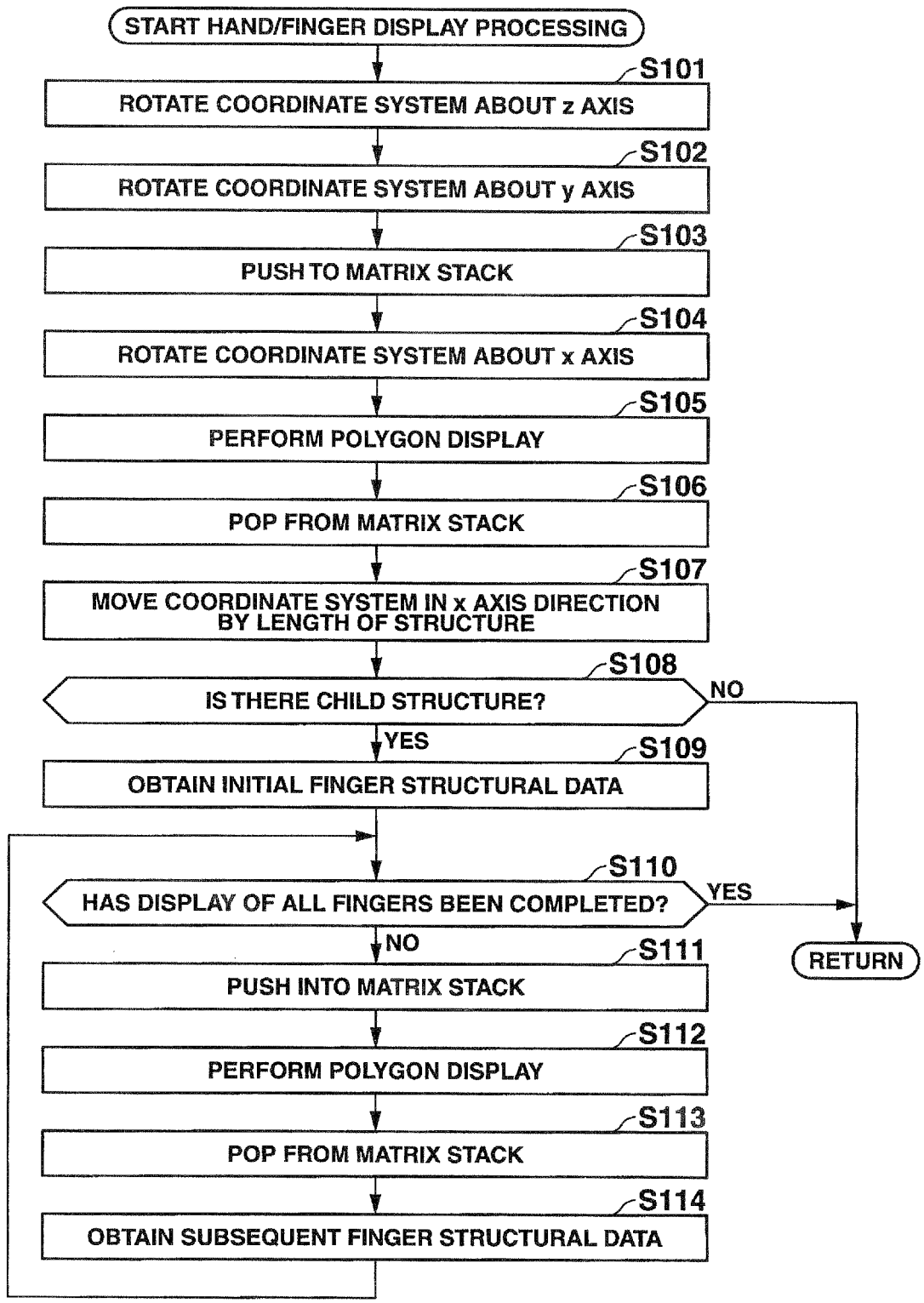
FIG. 17 is a flowchart showing a flow of finger display processing.

FIG. 17 is a flowchart showing the flow of the finger display processing. In addition, it should be noted that Motion[ ] described in this flowchart is replaced by MotionR[ ] in a case of performing finger movement processing corresponding to the right hand and is replaced by MotionL[ ] in a case of performing finger movement processing corresponding to the left hand.

In Step S101, the CPU 11 obtains a value (z-axis rotation angle) of Lambda[ ] with reference to the structural data (Struct[ ]) stored in the RAM 13. Then, the CPU 11 rotates the display angle of the z-axis in the coordinate system based on the z-axis rotation angle thus obtained.

In Step S102, the CPU 11 obtains the value of Phi[ ] (the y-axis rotation angle) with reference to the structural data (Struct[ ]) stored in the RAM 13. Then, the CPU 11 rotates the display angle of the y-axis in the coordinate system based on the y-axis rotation angle thus obtained.

In Step S103, the CPU 11 pushes the hand structural data that was obtained in Step S84 of FIG. 16 into the matrix stack. Here, the CPU 11 multiplies the value of the arm structural data in Step S92 of FIG. 16 by the hand structural data, and then pushes the result of multiplication into the matrix stack. When the hand structural data is displayed in this state, the hand is displayed in a state connected with the arm.

In Step S104, the CPU 11 obtains the value of Theta[ ] (x-axis rotation angle) with reference to the structural data (Struct[ ]) stored in the RAM 13. Then, the CPU 11 rotates the x-axis display angle in the coordinate system based on the x-axis rotation angle thus obtained.

In Step S105, the CPU 11 performs polygon display of the hand structural data stored in the matrix stack. As described above, the hand is displayed in the state connected with the arm.

In Step S106, the CPU 11 pops the hand structural data from the matrix stack.

In Step S107, the CPU 11 obtains the value of Length from the structural data (Struct[ ]) stored in the RAM 13. Then, the CPU 11 moves the coordinate system in the x-axis direction by the length of the structure.

In Step S108, the CPU 11 determines if there is a child structure while referencing the value of Children of the structural data (Struct[ ]) stored in the RAM 13. Here, a child structure refers to a finger. In the case of a YES determination, the CPU 11 advances the processing to Step S109, and in the case of a NO determination, the CPU 11 ends the finger display processing.

In Step S109, the CPU 11 refers to the value of Child[ ] of the structural data (Struct[ ]) stored in the RAM 13, and obtains initial finger structural data. For example, when obtaining the finger structural data from a thumb to a little finger sequentially, the CPU 11 obtains the parent structure data of the thumb as initial finger structural data.

In Step S110, the CPU 11 determines whether display of all of the fingers is completed. In the case of a YES determination, the CPU 11 ends the finger display processing, and in the case of a NO determination, the CPU 11 advances the processing to Step S111.

In Step S111, the CPU 11 pushes the finger structural data obtained in Step S109 or Step S114 into the matrix stack. Here, the CPU 11 multiplies the value of the hand structural data by the finger structural data, and then pushes the result from the multiplication into the matrix stack. When the finger structural data is displayed in this state, the finger is displayed in the state connected with the hand.

In Step S112, the CPU 11 performs polygon display of the structural data that was pushed into the matrix stack in Step S111.

In Step S113, the CPU 11 pops the structural data on which polygon display was performed in Step S112 from the matrix stack.

In Step S114, the CPU 11 obtains subsequent finger structural data. For example, when the structural data of a thumb has been obtained immediately before, the CPU 11 obtains structural data corresponding to an index finger. In addition, for example, in a case in which structural data of the little finger was been obtained immediately before, the CPU 11 obtains structural data corresponding to a little finger again.

Next, a data structure and a flow of processing will be explained that are referenced when performing enlarged music playing movement display. In addition, it should be noted that, since the point of view is moved in the enlarged music playing video display, a case of performing the enlarged music playing movement display is also called "during point of view movement".

FIG. 18 is a diagram showing a structure of movement information that is referenced in the enlarged music playing movement display.

As described above, the movement information is configured from MotionR[ ] indicating right hand movement information and MotionL[ ] indicating left hand movement information.

Since MotionR[ ] and MotionL[ ] are the same in configuration, this MotionR[ ] and MotionL[ ] are collectively referred to as Motion[ ] in FIG. 18.

As shown in FIG. 18, Time, RootPos[3], MaxHandPos[3], MinHandPos[3], and WristPos[3] are defined for each element in Motion[ ] that is referenced when performing the enlarged music playing video display.

Time is a variable showing a time when each frame is started while playing music.

RootPos[3] is the three dimensional coordinates of a point of origin in a structure displayed on the display unit 16 (three dimensional coordinates of a joint point of origin).

MaxhandPos[3] is a variable showing the three dimensional coordinates of a rightmost hand joint during point of view movement.

MinHandPos[3] is a variable showing the three dimensional coordinates of a leftmost hand joint during point of view movement.

WristPos[3] is a variable showing the three dimensional coordinates of a wrist joint during point of view movement.

Figure 19:
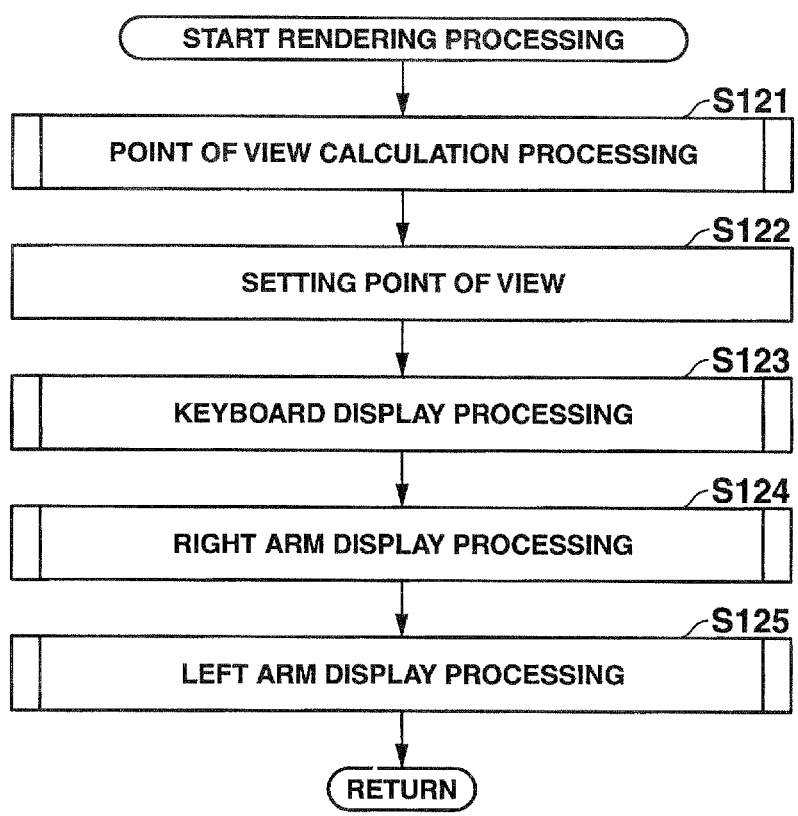
FIG. 19 is a flowchart showing a flow of rendering processing during point of view movement.

FIG. 19 is a flowchart showing the flow of rendering processing during point of view movement. In addition, it should be noted that the rendering processing is performed continuously after the data initialization/reading processing of Step S1 in the main processing explained in FIG. 9 is completed.

In Step S121, the CPU 11 performs point of view calculation processing. The details of point of view calculation processing are described in detail with reference to FIG. 20.

In Step S122, the CPU 11 performs the point of view setting processing.

That is to say, the CPU 11 sets a point of view on a screen displayed on the display unit 16 based on a height-direction view angle (f0vy), a center coordinate of a view (Center[3]), and a point of view (Eye[3]) stored in a control variable stored in the RAM 13.

In Step S123, the CPU 11 performs the keyboard display processing, which is described in detail with reference to FIG. 15.

In Step S124, the CPU 11 performs the right arm display processing, which is described in detail with reference to FIG. 16.

In Step S125, the CPU 11 performs the left arm display processing, which is described in detail with reference to FIG. 16.

Figure 20:
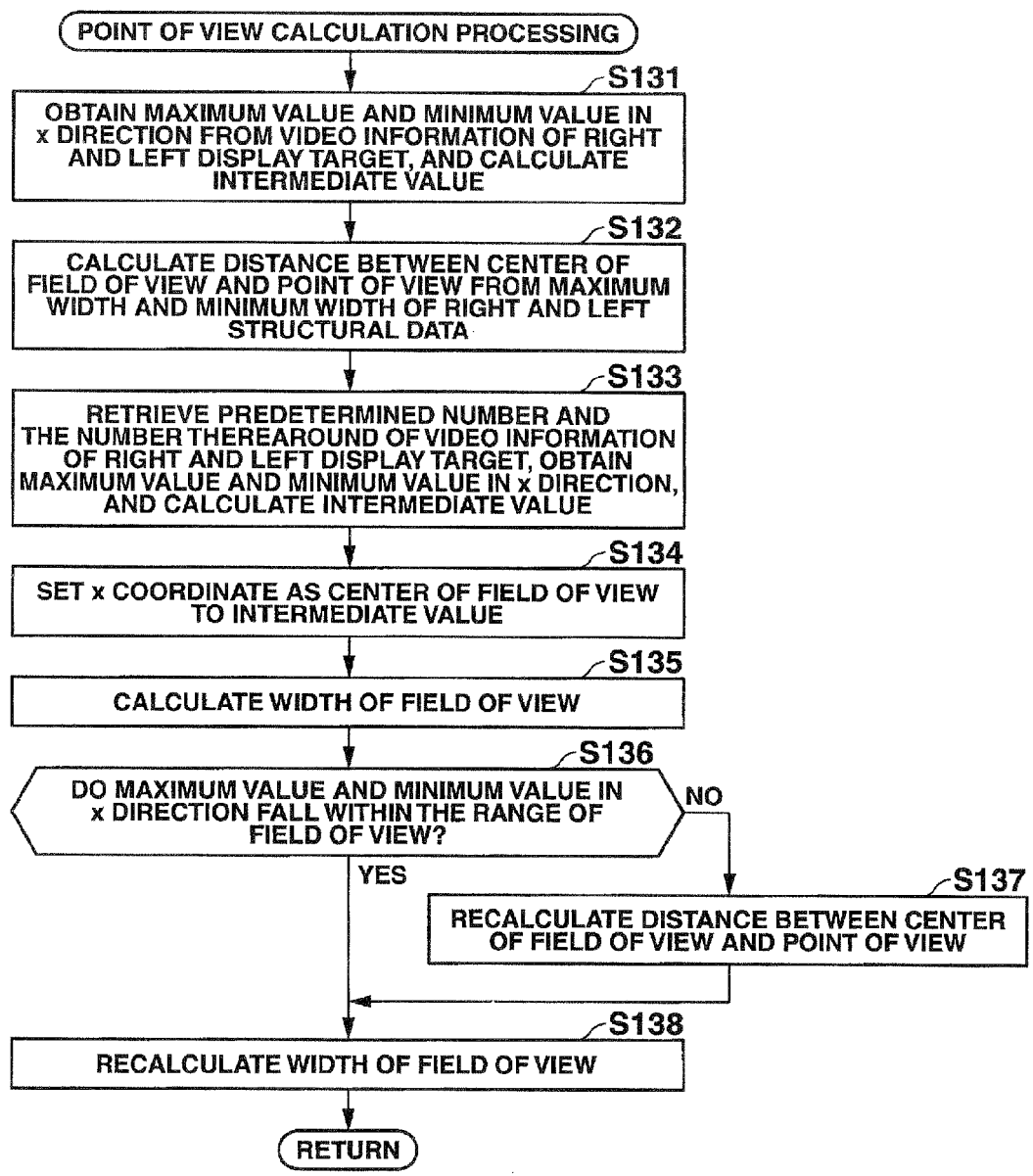
FIG. 20 is a flowchart showing a flow of the point of view calculation processing.

FIG. 20 is a flowchart showing the flow of the point of view calculation processing.

In Step S131, the CPU 11 obtains a maximum value and a minimum value in the x-direction from the video information of a right and left display target and calculates an intermediate value between the maximum value and the minimum value thus obtained.

In Step S132, the CPU 11 calculates the distance between the center of the field of view and the point of view from the maximum width and the minimum width of the right and left structural data.

In Step S133, the CPU 11 retrieves a predetermined number and the number therearound of the video information of the right-left display target, obtains the maximum value and the minimum value in the x-direction, and calculates an intermediate value.

In Step S134, the CPU 11 sets an x-coordinate as a center of the field of view to the intermediate value.

In Step S135, the CPU 11 calculates a range of a field of view.

In Step S136, the CPU 11 determines whether the maximum value and the minimum value in the x-direction obtained in Step S131 fall within a range of the field of view (within a field of view) calculated in Step S135. In the case of a YES determination, the CPU 11 advances the processing to Step S138, and in the case of a NO determination, the CPU 11 advances the processing to Step S137.

In Step S137, the CPU 11 recalculates the distance between the center of the field of view and the point of view.

In Step S138, the CPU 11 recalculates the range of the field of view.

Next, the data structure and the flow of processing referenced when inserting the music playing technique display during playing music will be explained. In addition, it should be noted that, since the point of view is moved in the enlarged music playing video display, a case of performing the enlarged music playing movement display is also called "during point of view movement.

FIG. 21 is a diagram showing a structure of control variables referenced when performing the music playing movement display including the music playing technique display. In addition, it should be noted that, when performing the music playing movement display including the music playing technique display using the control variables shown in FIG. 21, the hands and fingers are enlarged automatically and displayed obliquely so that the detailed movements of hands and fingers can be recognized when having approached a part in the music requiring a certain music playing technique.

For the control variables which are referred to when performing the music playing movement display including the music playing technique display, the width, height, f0vy, Center[3], Eye[3], EyeVector[3], Vertical[3], Horizonal[3], AutoAngleStatus, Start, Return, EyeVectorN[3], EyeAngle, NoteR[ ], StructR[ ], MotionR[ ], IndexR, NoteL[ ], StructL[ ], MotionL[ ], IndexL are defined as variables.

Since the width, height, f0vy, Center[3], Eye[3], and EyeVector[3] are the same as the control variables shown in FIG. 4, explanations thereof are omitted.

Vertical[3] is a variable showing a vector in a vertical direction of the field of view (screen height).

Horizontal[3] is a variable showing a vector in a horizontal direction of the field of view (screen width).

AutoAngleStatus is a variable showing a status of a point of view movement. For example, in a case of AutoAngleStatus being "0", it indicates a status in which the point of view is not moved (stopped); in the case of "+", it indicates a status of during movement; and in the case of "−", it indicates a status of during return.

Start is a variable showing a movement start time, which is a time at which to start the display of a music playing technique.

Return is a variable showing a return start time, which is a time at which to return to a normal display state after the display of the music playing technique ends.

EyeVectorN[3] is a variable showing a normal vector of a line-of-sight rotation face.

EyeAngle is a variable showing a line-of-sight rotation angle.

Since NoteR[ ], StructR[ ], MotionR[ ], IndexR, NoteL[ ], StructL[ ], MotionL[ ], and IndexL are the same as the control variables shown in FIG. 4, explanations thereof are omitted.

FIG. 22 is a diagram showing a structure of music playing information referenced when performing the music playing movement display including the music playing technique display.

As described above, the music playing information is configured from NoteR[ ] representing music playing information by a right hand and NoteL[ ] representing music playing information by a left hand.

Since NoteR[ ] and NoteL[ ] are the same in configuration, this NoteR[ ] and NoteL[ ] are collectively referred to as Note[ ] in FIG. 22.

As shown in FIG. 22, each element in Note[ ] defines Time, Gate, Pitch, Finger, and FigTech[ ].

Time is a variable representing a time when a sound starts.

Gate is a variable representing a time for which a sound continues.

Pitch is a variable representing the pitch of a sound generated (frequency).

Finger is a variable representing a finger number. The finger number refers to a number for identifying each finger during music playing.

FigTech[ ] is a sequence variable representing a music playing technique flag. For FigTech[ ], the number of elements equal to the number of the movement steps defined in the music playing technique is provided.

Figure 23:
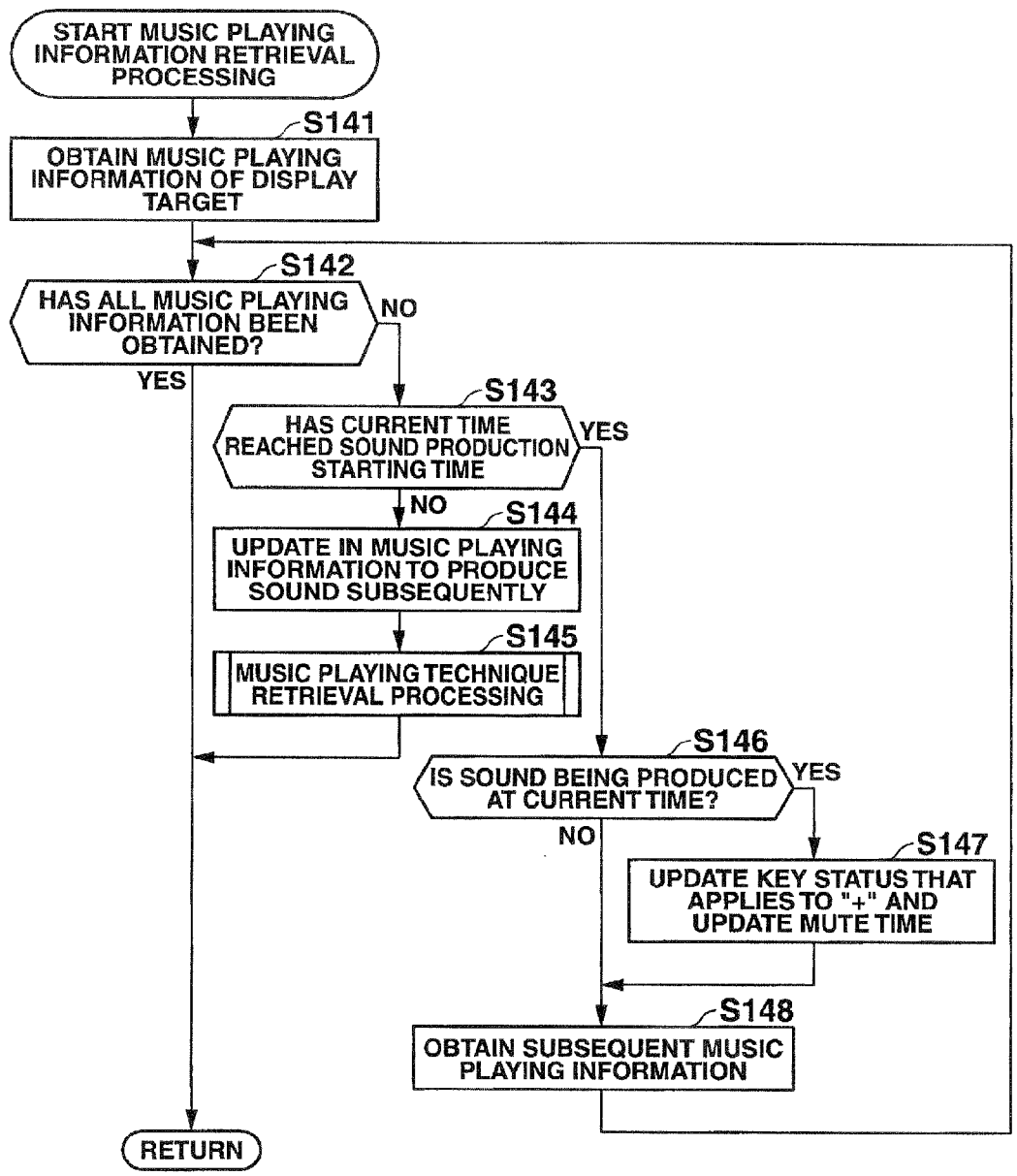
FIG. 23 is a flowchart showing a flow of music playing information retrieval processing executed when performing music playing movement display including music playing technique display.

FIG. 23 is a flowchart showing the flow of music playing information retrieval processing executed when performing the music playing movement display including the music playing technique display.

In addition, it should be noted that Note[ ] described in this flowchart is replaced by NoteR[ ] in a case of performing right-hand-part movement information retrieval processing and is replaced by NoteL[ ] in a case of performing left-hand-part movement information retrieval processing.

Since the processing from Step S141 to Step S143 is the same as the processing from Step S41 to Step S43 of FIG. 12, explanations thereof are omitted.

In Step S144, similar to the processing in Step S44, the CPU 11 updates the music playing information stored in the control variable (handCtrl) stored in the RAM 13 to music playing information to produce a sound subsequently.

In Step S145, the CPU 11 performs music playing technique retrieval processing. The music playing technique retrieval processing is described in detail with reference to FIG. 24. When this processing ends, the CPU 11 ends the movement information retrieval processing.

Since the processing from Step S146 to Step S148 is the same as the processing from Step S45 to Step S47 of FIG. 12, explanations thereof are omitted.

Figure 24:
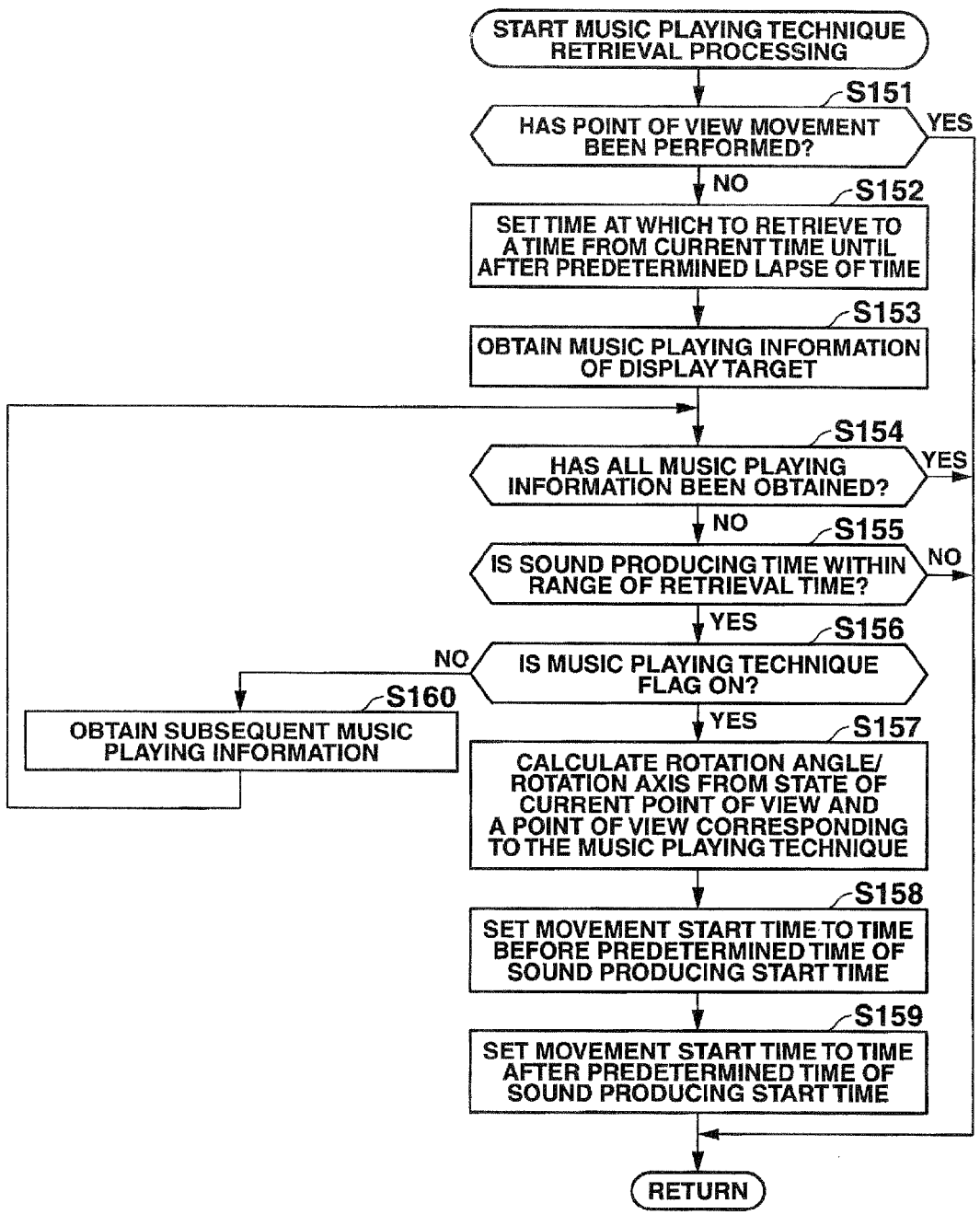
FIG. 24 is a flowchart showing a flow of music playing technique retrieval processing executed when performing music playing movement display including music playing technique display.

FIG. 24 is a flowchart showing the flow of the music playing technique retrieval processing executed when performing the music playing movement display including the music playing technique display. In addition, it should be noted that, upon executing the present flowchart, the control variables shown in FIG. 21 are stored in the RAM 13.

In Step S151, the CPU 11 refers to AutoAngleStatus of the control variables (handCtrl) stored in the RAM 13 and determines whether to perform the point of view movement. In the case of a YES determination, the CPU 11 ends the music playing technique retrieval processing, and in the case of a NO determination, the CPU 11 advances the processing to Step S152.

In Step S152, the CPU 11 sets a time, serving as a retrieving target (retrieval time) for determining whether to perform the music playing technique display, to a time from the current time until a predetermine lapse of time.

In Step S153, the CPU 11 obtains Note[ ] as music playing information targeted for displaying from the control variables (handCtrl) stored in the RAM 13.

In Step S154, the CPU determines whether the CPU 11 obtained all of the music playing information based on the music playing information targeted for display that was obtained in Step S153 or Step S160. That is to say, the CPU 11 determines whether the suffix of Note[ ] is equal to a maximum value of the suffix of Note[ ] stored in the ROM 12. In the case of a YES determination, the CPU 11 ends the music playing technique retrieval processing, and in the case of a NO determination, the CPU 11 advances the processing to Step S155.

In Step S155, the CPU 11 determines whether a sound producing time is within the range of the retrieval time set in Step S152. In the case of a YES determination, the CPU 11 advances the processing to Step S156, and in the case of a NO determination, the CPU 11 ends the music playing technique retrieval processing.

In Step S156, the CPU 11 refers to FigTech[ ] of the music playing information shown in FIG. 22 and determines whether the music playing technique flag is ON. In the case of a YES determination, the CPU 11 advances the processing to Step S157, and in the case of a NO determination, the CPU 11 advances the processing to Step S160.

In Step S157, the CPU 11 calculates a rotation angle/rotation axis from a state of the current point of view and a point of view corresponding to the music playing technique.

In Step S158, the CPU 11 sets a time at which to start a music playing technique display (movement start time) to a time before a predetermined time of a sound producing time. That is to say, the CPU 11 sets Start of the control variables stored in the RAM 13.

In Step S159, the CPU 11 sets a time at which to return from the music playing technique display to the normal music playing movement display or the enlarged music playing movement display (return start time) to a time after a predetermined time. When this processing ends, the CPU 11 ends the music playing technique retrieval processing. That is to say, the CPU 11 sets Return of the control variables stored in the RAM 13.

In Step S160, the CPU 11 obtains subsequent music playing data and advances the processing to Step S154.

Figure 25:
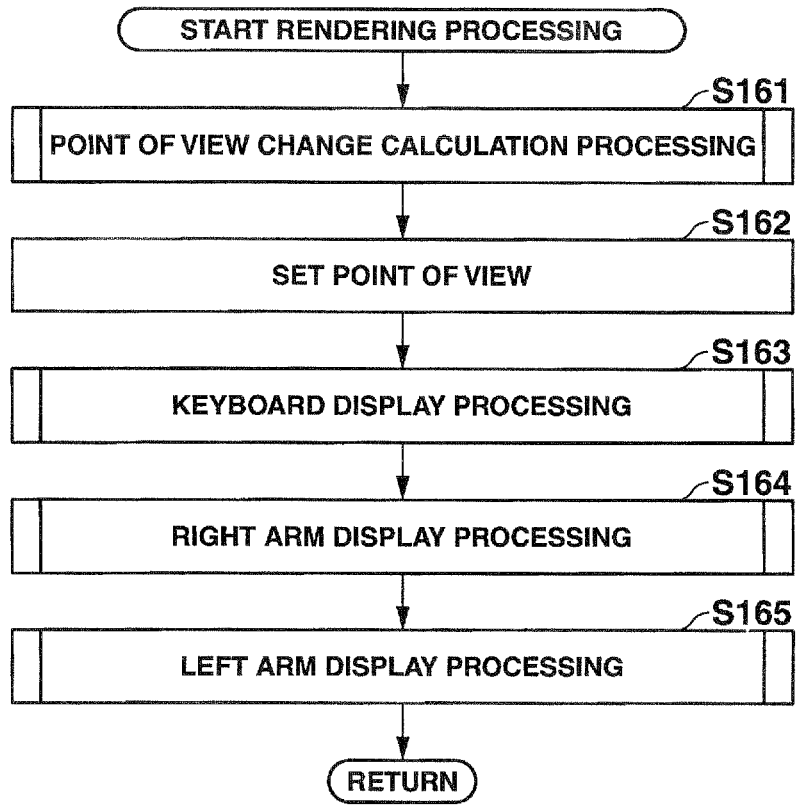
FIG. 25 is a flowchart showing a flow of rendering processing executed when performing music playing movement display including music playing technique display.

FIG. 25 is a flowchart showing the flow of rendering processing executed when performing the music playing movement display including the music playing technique display. In addition, it should be noted that the rendering processing is performed continuously after the data initialization/reading processing of Step S1 in the main processing explained in FIG. 9 is completed. In addition, it should be noted that the CPU 11 may set to be displayed in an enlarged manner while the music playing technique is being displayed by executing the point of view calculation processing shown in FIG. 20 at the time of starting this rendering processing.

In Step S161, the CPU 11 executes point of view change calculation processing. The details of the point of view change calculation processing are described in detail with reference to FIG. 26.

In Step S162, the CPU 11 executes point of view set processing.

That is to say, the CPU 11 sets a point of view on the screen displayed on the display unit 16 based on a height-direction view angle (f0vy), a center coordinate of a view (Center[3]), and a point of view (Eye[3]) stored in a control variable stored in the RAM 13.

In Step S163, the CPU 11 executes the keyboard display processing described in detail with reference to FIG. 15.

In Step S164, the CPU 11 executes the right arm display processing described in detail with reference to FIG. 16.

In Step S165, the CPU 11 executes the left arm display processing described in detail with reference to FIG. 16.

Figure 26:
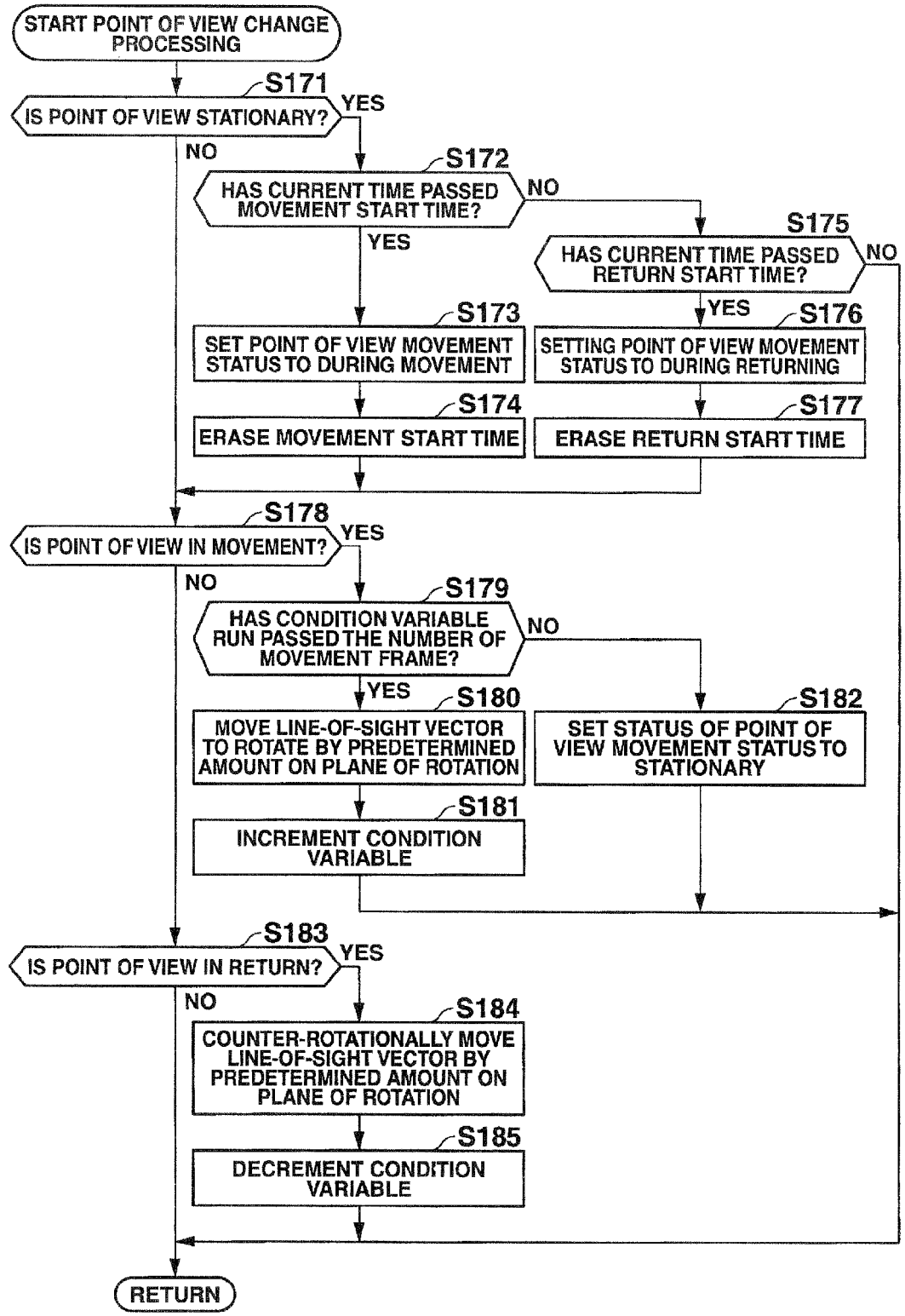
FIG. 26 is a flowchart showing a flow of point of view change calculation processing executed when performing music playing movement display including music playing technique display.

FIG. 26 is a flowchart showing the flow of the point of view change calculation processing executed when performing the music playing movement display including the music playing technique display. In addition, it should be noted that the point of view change calculation processing is performed continuously after the data initialization/reading processing of Step S1 in the main processing explained in FIG. 9 being completed.

In Step S171, the CPU 11 refers to AutoAngleStatus of the control variables stored in the RAM 13 and determines whether the point of view is stationary. More specifically, the CPU 11 determines that the point of view ceases when the value of AutoAngleStatus of the control variable stored in the RAM 13 is "0". In the case of a YES determination, the CPU 11 advances the processing to Step S172, and in the case of a NO determination, the CPU 11 advances the processing to Step S178.

In Step S172, the CPU 11 refers to Start of the control variables stored in the RAM 13 (movement start time) and determines whether the current time updated in Step S14 of FIG. 10 has passed the movement start time. In the case of a YES determination, the CPU 11 advances the processing to Step S173, and in the case of a NO determination, the CPU 11 advances the processing to Step S175.

In Step S173, the CPU 11 sets the point of view movement status to during movement by setting AutoAngleStatus of the control variables stored in the RAM 13 to "+". Furthermore, the CPU 11 calculates and stores the number of movement frames in the RAM 13 based on the movement start time and the return start time. Furthermore, the CPU 11 stores an initial value of a condition variable as 0 in the RAM 13.

In Step S174, the CPU 11 erases Start of the control variables stored in the RAM 13 (movement start time).

In Step S175, the CPU 11 refers to Return of the control variables stored in the RAM 13 (return start time) and determines whether the current time updated in Step S14 of FIG. 10 has passed the return start time. In the case of a YES determination, the CPU advances the processing to Step S176, and in the case of a NO determination, the CPU 11 ends the point of view change processing.

In Step S176, the CPU 11 sets the point of view movement status to during return by setting AutoAngleStatus of the control variables stored in the RAM 13 to "−". Furthermore, the CPU 11 stores an initial value of a condition variable as the number of movement frames calculated in Step S173, in the RAM 13.

In Step S177, the CPU 11 erases Return (return start time) of control variables stored in the RAM 13.

In Step S178, the CPU 11 refers to AutoAngleStatus of the control variables stored in the RAM 13 and determines whether it is during the point of view being moved or not. More specifically, the CPU 11 determines it is during the point of view being moved when a value of AutoAngleStatus of the control variables stored in the RAM 13 is "+". In the case of a YES determination, the CPU 11 advances the processing to Step S179, and in the case of a NO determination, the CPU 11 advances the processing to Step S183.

In Step S179, the CPU 11 determines whether the condition variable stored in the RAM 13 runs beyond the number of movement frames stored in the RAM 13. In the case of a YES determination, the CPU 11 advances the processing to Step S180, and in the case of a NO determination, the CPU 11 advances the processing to Step S182.

In Step S180, the CPU 11 moves the line-of-sight vector to rotate by a predetermined amount on the plane of rotation. More specifically, the CPU 11 computes EyeVector[3] of the control variables stored in the RAM 13 so as to rotationally move.

In Step S181, the CPU 11 increments a value of the condition variables stored in the RAM 13. When the processing of Step S181 ends, the CPU 11 ends the point of view change processing.

In Step S182, the CPU 11 sets the point of view movement status to the status of the point of view stationary. More specifically, the CPU 11 sets AutoAngleStatus of the control variables stored in the RAM 13 to "0". Furthermore, the CPU 11 erases the condition variable from the RAM 13. When the processing of Step S182 ends, the CPU 11 ends the point of view change processing.

In Step S183, the CPU 11 refers to AutoAngleStatus of the control variable stored in the RAM 13 and determines whether it is during return. More specifically, the CPU 11 determines that it is during the point of view being moved when a value of AutoAngleStatus of the control variable stored in the RAM 13 is "−". In the case of a YES determination, the CPU 11 advances the processing to Step S184, and in the case of a NO determination, the CPU 11 ends the point of view change processing.

In Step S184, the CPU 11 moves the line-of-sight vector to counter-rotationally move by a predetermined amount on the plane of rotation. More specifically, the CPU 11 computes EyeVector[3] of the control variables stored in the RAM 13 so as to counter-rotationally move.

In Step S185, the CPU 11 decrements a value of the condition variables stored in the RAM 13. When the processing of Step S185 ends, the CPU 11 ends the point of view change processing.

According to the music playing movement display device 1 of the present embodiment described above, the CPU 11 determines whether to perform display of a music playing technique based on a music playing technique flag of the music playing information stored in the RAM 13, and in a case of having determined to perform the display of the music playing technique, causes the display mode of the image corresponding to the music playing technique to change, compared to a display mode of an image corresponding to that of a case of not displaying the music playing technique.

It is thereby possible for the music playing movement display device 1 to perform a display of a music playing movement which is easily recognized visually for a player by changing the display mode in the case of displaying a music playing technique.

More specifically, with the music playing movement display device 1, the CPU 11 displays the structure data displayed on the display unit 16 in an enlarged manner in the case of displaying the music playing technique.

The music playing movement display device 1 displays hands and fingers in an enlarged manner at the time corresponding to a time when the music playing technique is required, whereby the movement display of the music playing technique can be more easily recognized visually by a player. Furthermore, when replaying a sequence of music playing movements, a field of view is displayed as wide as possible in proportion to a movement region; therefore, it becomes possible for a player to recognize the movements more easily.

Specifically, wit the music playing movement display device 1, when performing display of the music playing technique, the CPU 11 displays the structural data displayed on the display unit 16 in an oblique manner.

The music playing movement display device 1 displays hands and fingers obliquely in a scene corresponding to that requiring a music playing technique, whereby it becomes possible for a player to easily recognize movement display visually, compared to a case of displaying a movement of the music playing technique vertically or horizontally. For example, since display status such as an angle is changed in association with a movement display of the music playing technique, even a complicated movement can be displayed in an easily visually recognizable and a plain manner, especially for a beginner.

It should be noted that the present invention is not limited to the aforementioned embodiments, and that modifications, improvements, etc. within a scope that can achieve the object of the present invention are included in the present invention.

In addition, although the music playing movement display device to which the present invention is applied has been explained with the music playing movement display device 1 as an example in the aforementioned embodiment, it is not particularly limited thereto.

For example, the present invention can be applied to general-purpose electronic equipment having a keyboard as well as a music playing movement display function. More specifically, the present invention is applicable to an electronic piano, an electronic organ, and the like, for example.

The aforementioned sequence of processing can be made to be executed by hardware, or can be made to be executed by software.

In other words, the configuration of FIG. 1 is simply one example, and the present invention is not limited thereto. That is to say, it is sufficient so long as the music playing movement display device 1 includes a function that can entirely execute the aforementioned sequence of processing, and thus a configuration for achieving such a function is not limited to the example of FIG. 1.

In the case of having the sequence of processing executed by way of software, a program constituting this software is installed from the Internet or a recording medium into a computer or the like.

This computer may be a computer incorporating special-purpose hardware. Alternatively, the computer may be a computer capable of executing various functions by installing various programs.

It should be noted that the steps describing the program recorded in the recording medium naturally include processing performed chronologically in the described order, but is not necessarily processed chronologically, and also includes processing executed in parallel or separately.

Furthermore, in the specification of the present application, the term system shall refer to the meanings including an entire apparatus configured by a plurality of devices, means, and the like.

Although several embodiments of the present invention have been explained in the foregoing, these embodiments are merely exemplifications, and are not to limit the technical scope of the present invention. The present invention can adopt various other embodiments, and further, various modifications such as omissions an substitutions can be made thereto within a scope that does not deviate from the gist of the present invention. These embodiments and modifications thereof are included in the scope of and gist of the invention described in the present disclosure, and are included in the invention described in the accompanying claims and the scope of equivalents thereof.

What is claimed is:

1. A music playing movement display device comprising:
   a memory that stores (a) music playing information including a sound production starting time, a sound continuation time, a pitch, and a finger used, (b) a structural data group including a plurality of kinds of structural data and structure-relation data that determines a relevance between the structural data, and (c) movement information that indicates an original piece of information of the structural data when the structural data is displayed and which corresponds to the sound production starting time;
   a reading unit that successively reads the music playing information stored in the memory;
   a display controller that successively displays, on a display unit, a music playing movement image of fingers of two hands, the two hands, and two arms, in a first point of view state, based on the movement information, the structural data group, and the music playing information read by the reading unit;

a retrieving unit that retrieves predetermined music playing information for displaying a specific movement, from the music playing information, from a time when the reading unit starts to read the music playing information;

a field of view calculation unit that calculates center coordinates and a width of a field of view on a display screen of the display unit;

a rotation angle/rotation axis calculation unit that calculates a rotation angle and a rotation axis, based on (i) the first point of view state and (ii) a second point of view state that is suitable for viewing the specific movement, when the retrieving unit retrieves the predetermined music playing information; and a field of view change unit that rotationally moves a field of view vector based on the rotation angle and the rotation axis calculated by the rotation angle/rotation axis calculation unit, and changes at least one of (i) the center coordinates of the field of view, (ii) the width of the field of view, and (iii) a distance between a point of view in the first point of view state and the center coordinates of the field of view, based on the field of view vector that is rotationally moved, to thereby change the music playing movement image.

2. The music playing movement display device according to claim 1, wherein the structure-relation data is data representing a connecting relationship between the structural data when images of structures to be displayed corresponding to respective structural data are displayed so as to be connected to an image of another structure.

3. The music playing movement display device according to claim 1, wherein the structural data respectively includes three dimensional coordinates of each vertex on a polygon which is a structure to be displayed, a length of another structure that is connected to the structure displayed according to the structural data, and a variable indicating a rotation angle of an x-axis, a variable indicating a rotation angle of a y-axis, and a variable indicating a rotation angle of a z-axis, of the other structure, and the display controller displays an image of a corresponding structure on the display unit based on the structural data.

4. The music playing movement display device according to claim 3, wherein the display controller rotates a display angle of the three dimensional coordinates of each vertex on the polygon based on the variable indicating the rotation angle of the x-axis, the variable indicating the rotation angle of the y-axis, and the variable indicating the rotation angle of the z-axis, of the other structure, and subsequently executes display of the polygon rotated by this display angle.

5. The music playing movement display device according to claim 1, wherein the movement information comprises three dimensional coordinates of an origin of an image of a structure to be displayed, corresponding to the original piece of information of the structural data, and wherein the field of view calculation unit includes:

a field of view center/distance calculation unit that calculates the distance between the center coordinate of the field of view and the point of view by using a maximum width and a minimum width of an image of a structure to be displayed, based on the structural data group stored in the memory;

an intermediate value calculation unit that calculates an intermediate value from a maximum value and a minimum value of a motion image displayed, based on a predetermined number of the movement information stored in the memory; and a field of view width calculation unit that calculates the width of the field of view, based on the distance between the center coordinate of the field of view and the point of view calculated by the field of view center/distance calculation unit and the intermediate value calculated by the intermediate value calculation unit.

6. A music playing movement display method executed by a music playing movement display device including a memory that stores (a) music playing information including a sound production starting time, a sound continuation time, a pitch, and a finger used, (b) a structural data group including a plurality of kinds of structural data and structure-relation data that determines the a relevance between the structural data, and (c) movement information that shows indicates an original piece of information of the structural data when the structural data is displayed and which corresponds to the sound production starting time the method comprising: successively reading the music playing information stored in the memory;

performing control to successively display, on a display unit, a music playing movement image of fingers of two hands, the two hands, and two arms, in a first point of view state, based on the movement information, the structural data group, and the read music playing information;

retrieving predetermined music playing information for displaying a specific movement, from the music playing information, from a time of a start of reading the music playing information;

calculating center coordinates and a width of a field of view on a display screen of the display unit;

calculating a rotation angle and a rotation axis, based on (i) the first point of view state and (ii) a second point of view state that is suitable for viewing the specific movement, when the predetermined music playing information is retrieved; and rotationally moving a field of view vector based on the calculated rotation angle and rotation axis, and changing at least one of (i) the center coordinates of the field of view, (ii) the width of the field of view, and (iii) a distance between a point of view in the first point of view state and the center coordinates of the field of view, based on the field of view vector that is rotationally moved, to thereby change the music playing movement image.

7. A non-transitory computer-readable storage medium having stored thereon a program that is executable by a computer used in a music playing movement display device including a memory that stores (a) music playing information that includes a sound production starting time, a sound continuation time, a pitch, and a finger used, (b) a structural data group including a plurality of kinds of structural data and structure-relation data that determines a relevance between the structural data, and (c) movement information that indicates an original piece of information of the structural data when the structural data is displayed and which corresponds to the sound production starting time, the program being executable by the computer to cause the computer to perform functions comprising:

successively reading the music playing information stored in the memory;

performing control to successively display, on a display unit, a music playing movement image of fingers of two hands, the two hands, and two arms, in a first point of view state, based on the movement information, the structural data group, and the read music playing information;

retrieving predetermined music playing information for displaying a specific movement, from the music playing information, from a time of a start of reading the music playing information;

calculating center coordinates and a width of a field of view on a display screen of the display unit;

calculating a rotation angle and a rotation axis, based on (i) the first point of view state and (ii) a second point of view state that is suitable for viewing the specific movement, when the predetermined music playing information is retrieved; and rotationally moving a field of view vector based on the calculated rotation angle and rotation axis, and changing at least one of (i) the center coordinates of the field of view, (ii) the width of the field of view, and (iii) a distance between a point of view in the first point of view state and the center coordinates of the field of view, based on the field of view vector that is rotationally moved, to thereby change the music playing movement image.

\* \* \* \* \*

UNITED STATES PATENT AND TRADEMARK OFFICE
CERTIFICATE OF CORRECTION

PATENT NO.        : 8,895,829 B2
APPLICATION NO.   : 13/661607
DATED             : November 25, 2014
INVENTOR(S)       : Junichiro Soejima Page 1 of 1

It is certified that error appears in the above-identified patent and that said Letters Patent is hereby corrected as shown below:

On the Title page; Item (57) Abstract, line 4:
    delete "the" and insert --The--.

In the Claims

Column 22, Line 13, Claim 6, Line 7:
    after "determines" delete "the".

Column 22, Line 14, Claim 6, Line 8:
    after "that" delete "shows".

Column 22, Line 17, Claim 6, Line 11:
    change "time" to --time,--.

Signed and Sealed this
Twenty-eighth Day of April, 2015

Michelle K. Lee
*Director of the United States Patent and Trademark Office*